United States Patent
Yuki et al.

(10) Patent No.: US 8,253,461 B2
(45) Date of Patent: Aug. 28, 2012

(54) WAVEFORM EQUALIZATION CIRCUIT WITH PULSE WIDTH MODULATION

(75) Inventors: Fumio Yuki, Fujimino (JP); Hiroki Yamashita, Hachioji (JP); Koji Fukuda, Huchu (JP)

(73) Assignee: Hitachi, Ltd., Tokyo (JP)

( * ) Notice: Subject to any disclaimer, the term of this patent is extended or adjusted under 35 U.S.C. 154(b) by 240 days.

(21) Appl. No.: 12/826,648

(22) Filed: Jun. 29, 2010

(65) Prior Publication Data
US 2011/0001588 A1 Jan. 6, 2011

(30) Foreign Application Priority Data
Jul. 1, 2009 (JP) .................................. 2009-157036

(51) Int. Cl.
*H03K 3/017* (2006.01)
(52) U.S. Cl. ........................................ 327/172; 327/176
(58) Field of Classification Search .................. 327/172, 327/173, 174, 176
See application file for complete search history.

(56) References Cited

U.S. PATENT DOCUMENTS

| | | | | |
|---|---|---|---|---|
| 6,107,850 | A * | 8/2000 | Shimizu | 327/172 |
| 6,456,133 | B1 * | 9/2002 | Nair et al. | 327/175 |
| 6,459,315 | B2 * | 10/2002 | Orii | 327/172 |
| 6,940,328 | B2 * | 9/2005 | Lin | 327/175 |
| 7,986,179 | B2 * | 7/2011 | Chen et al. | 327/175 |

FOREIGN PATENT DOCUMENTS
WO   WO 2005/060193 A2   6/2005

* cited by examiner

*Primary Examiner* — Hai L Nguyen
(74) *Attorney, Agent, or Firm* — Miles & Stockbridge P.C.

(57) ABSTRACT

There is provided a waveform equalization circuit with pulse width modulation that includes pulse-width adjust-level generation circuits PWCLC1a, PWCLC2a, for generating a pulse-width adjust-level VCNT on the basis of preceding input data units Din_P, Din_N, respectively, pulse-width adjustment circuits PWCC1a, PWCC2a, for adjusting a pulse-width according to VCNT, respectively, and a waveform shaping circuit WAC for shaping a waveform of an output signal from each of the pulse-width adjustment circuits. The pulse-width adjustment circuit has a driving power to be controlled according to a consecutive bits count of each of the preceding input data units, and varies transition time of each of output data units Do1_P, Do1_N, thereby adjusting the pulse width. With the use of such a waveform equalization scheme as above, it is possible to attain reduction in power consumption due to simplification in circuit configuration, and further, use of CMOS circuits will enable power consumption to be held back to a low level.

14 Claims, 19 Drawing Sheets

PRINCIPLE OF PULSE-WIDTH ADJUSTMENT

DELAY ADJUSTMENT OUTPUT WAVEFORM

CONTROL RELATIONSHIP BETWEEN VCNT AND DELAY ADJUST PARAMETER

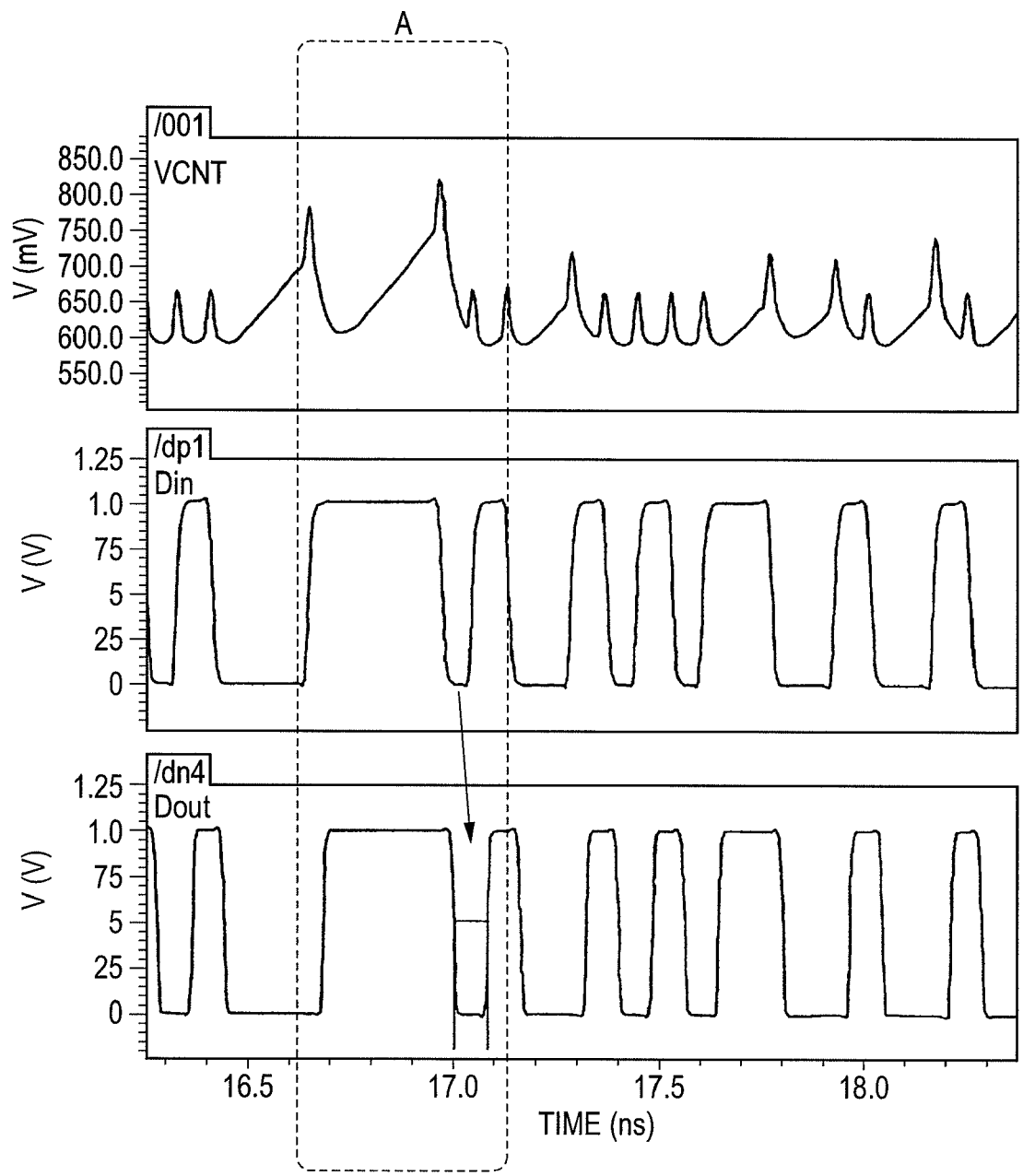

WITHOUT PULSE-WIDTH MODULATION

WITH PULSE-WIDTH MODULATION

PRINCIPLE OF PULSE-WIDTH ADJUSTMENT

DELAY ADJUSTMENT OUTPUT WAVEFORM

CONTROL RELATIONSHIP BETWEEN VCNT AND DELAY ADJUST PARAMETER

WAVEFORM EQUALIZATION CIRCUIT WITH PULSE WIDTH MODULATION

CLAIM OF PRIORITY

The present application claims priority from Japanese patent application JP 2009-157036 filed on Jul. 1, 2009, the content of which is hereby incorporated by reference into this application.

FIELD OF THE INVENTION

The present invention relates to a high-speed signal transmission circuit, and in particular, to a waveform equalization circuit capable of cancelling out effects of waveform distortion attributable to inter-symbol interference, occurring when logic signals are transmitted via transmission paths where electrical losses exist to thereby enable correct signals to be transmitted.

BACKGROUND OF THE INVENTION

As a transmission speed in communications between LSIs, or PWBs has rapidly increased in recent years, so a serial transmission method whereby both data and clock are transmitted by superposing one on another in one signal line has been in widespread use in place of a parallel transmission method using the conventional parallel-running clocks. With the serial transmission method, there is the need for increasing a transmission speed per one signal line by a quantum leap, which is accompanied by an increase in attenuation of a high-frequency component of a transmission signal, due to the skin effect of a transmission line conductor, or the dielectric loss of an insulating material, and so forth, so that deterioration in signal quality dependent on a transmission signal line, so-called ISI (Inter-Symbol Interference), appears on an input waveform at a signal-receiving end. For this reason, eye patterns at the signal-receiving end come to be narrowed down in both a time-axis direction (width), and an amplitude direction (height), and this creates a cause for inducing a reception error.

As a method for solving this problem, there has been generally adopted a method (for equalization at a transmission end) whereby a waveform as pre-distorted by taking into account a portion of a waveform, corresponding to ISI of a transmission line, is sent from a transmission end to thereby widen an eye at a receiving end.

For example, in WO2005/060193, use is made of a data output circuit as schematically shown in FIG. 19. The data output circuit in FIG. 19 is comprised of delay circuits DC1, DC2, each for effecting delay corresponding to one data symbol time length (maximum time permissible for transmission of one-bit data, the reciprocal of a data rate), output buffers BF1, BF2, BF3, each having a function for drive power adjustment, and a waveform adder MIX. In this case, there is shown an example where a transmission data signal is branched into three paths and waveforms with a drive power adjusted by a portion thereof, corresponding to three data symbol time lengths, respectively, are added thereto, thereby implementing waveform equalization. With this output circuit, the transmission data signal is directly delivered to the output buffer BF1 while the transmission data signal delayed by one data symbol time length, and the transmission data signal delayed by two data symbol time lengths are delivered to the output buffers BF2, BF3, respectively. Output signals from the output buffers BF1, BF2, BF3, respectively, are added together to be subsequently outputted to a transmission line. A control variable for waveform equalization can be adjusted by undergoing variation the number of data symbols for waveform addition, and respective drive powers of the output buffers BF1, BF2, and BF3. Thus, ISI at a symbol point can be reduced by adding up respective waveforms on a symbol time unit basis.

SUMMARY OF THE INVENTION

In, for example, the communications sector, and so forth, dramatic progress has been made toward higher data-transmission speed, so that in the case of communications between LSIs, or PWBs, there is the need for serial transmission over a distance on the order of 1 meter, and there is a requirement for sufficient performance in a class of 30 dB in transmission loss, and 10 Gbps in transmission speed. Because the signal quality of a reception waveform undergoes deterioration due to such attenuation in a transmission line, causing the eye patterns to narrow down, and inducing a reception error, there is a requirement for expansion of the eye patterns by use of a waveform equalization function at the transmission end. In such a case, use of a waveform equalization method as described in, for example, WO2005/060193 has been considered in the past.

For example, with the output circuit at the transmission end of a data transmission system, the respective waveforms as delayed on the symbol time unit basis are added up, as described with reference to, FIG. 19, thereby implementing the waveform equalization on the symbol time unit basis. In this case, however, due consideration has not been given in terms of reduction in power consumption. The circuit shown in FIG. 19 has a large number of circuit constituent components including the two delay circuits, three output buffers, and one waveform adder, and there is the need for flow of a steady-state current, accompanying the use of a CML (Current Mode Logic) circuit, so that current consumption is greater. Assuming that power consumption per one circuit is, for example, 2 mW, the power consumption of a waveform equalization circuit is 12 mW. Further, in order to enhance an effect of the waveform equalization, there is the need for increasing the number of the data symbols to be added up, leading to further increase in the number of circuits, and increase in power consumption.

Meanwhile, FIG. 18 shows a trend for serial transmission technology specification. As shown in FIG. 18, required throughput goes up year after year, and in 2010, a 10-Tbps class as a system throughput will be required. In order to meet such a requirement, there is the need for a system incorporating 10 sets of LSIs, each comprising 100 units of 10 Gbps SerDes (Serializer Deserializer) circuits, in parallel connection, each incorporating, for example, a waveform equalization circuit. In this case, in consideration of low cost mounting of the LSIs therein, an air-cooling method is generally selected as a method for cooling the LSIs. Further, if limitations to the effect of the air-cooling method are taken into account, one would want to hold back the power consumption of one LSI to the order of several W. That is, it is necessary to hold back power consumption per one channel of the SerDes circuit to the order of several tens of mW, so that it is essential to reduce the power consumption of the waveform equalization circuit.

It is therefore an object of the present invention to compensate for inter-symbol interference in a small-scale circuit to thereby attain reduction in power consumption.

The above and other objects, features and advantages of the present invention will be apparent from the following detailed description of the preferred embodiments of the invention in conjunction with the accompanying drawings.

A representative embodiment of the invention disclosed under the present application is briefly described as follows.

A waveform equalization circuit according to one embodiment of the present invention is comprised of pulse-width adjust-level generation circuits for generating a pulse-width adjust-level on the basis of a consecutive bits count (a pulse width) of each of preceding input data units, and pulse-width adjustment circuits for driving the input data units according to the relevant control voltage to vary transition time, thereby generating output data units having a variable pulse width. The pulse-width adjust-level generation circuit comprises, for example, an op-amp for outputting a control voltage, a capacitive element for accumulating charge on the basis of a consecutive bits count of an input data unit, first and second switches for detecting H/L of the input data unit to thereby determine whether or not charge is accumulated in the capacitive element, and so on.

Thus, if the charge based on the consecutive bits count of an input data unit is accumulated in the capacitive element, thereby executing capacitive element according to an accumulation amount of the charge, this will eliminate the need for adding up data symbol time lengths according to the preceding data unit as in the past, thereby downsizing a circuit scale. As a result, reduction in power consumption can be realized.

Further, the pulse-width adjustment circuit is comprised of a first MIS transistor of a first conductivity type, and a second MIS transistor of a second conductivity type, these transistors serving as a CMOS inverter having a common gate to which the output data unit is inputted, and a third MIS transistor of the first conductivity type, connected in series to the first MIS transistor, the third MIS transistor having a gate to which a control voltage is applied. A pulse width is adjusted by controlling a drive current of the first MIS transistor via the third MIS transistor.

Thus, with the use of a waveform equalization scheme whereby a pulse-width is controlled by adjusting delay of the MIS transistor according to the control voltage, it will be unnecessary to add up data symbol time lengths as in the case of the conventional voltage amplitude equalization, so that the circuit scale can be downsized. Furthermore, the pulse-width adjustment circuit can be made up of a CMOS circuit instead of a CML circuit that requires a steady-state current. In consequence, reduction in power consumption can be realized.

To put it briefly, the representative embodiment of the invention disclosed under the present application has an advantageous effect that compensation for the inter-symbol interference can be realized at low power consumption.

BRIEF DESCRIPTION OF THE DRAWINGS

FIG. 6 is simulation waveform chart showing waveforms obtained by conducting performance tests on the waveform equalization circuit with pulse width modulation shown in FIG. 2;

DETAILED DESCRIPTION OF THE PREFERRED EMBODIMENTS

Figure 1:
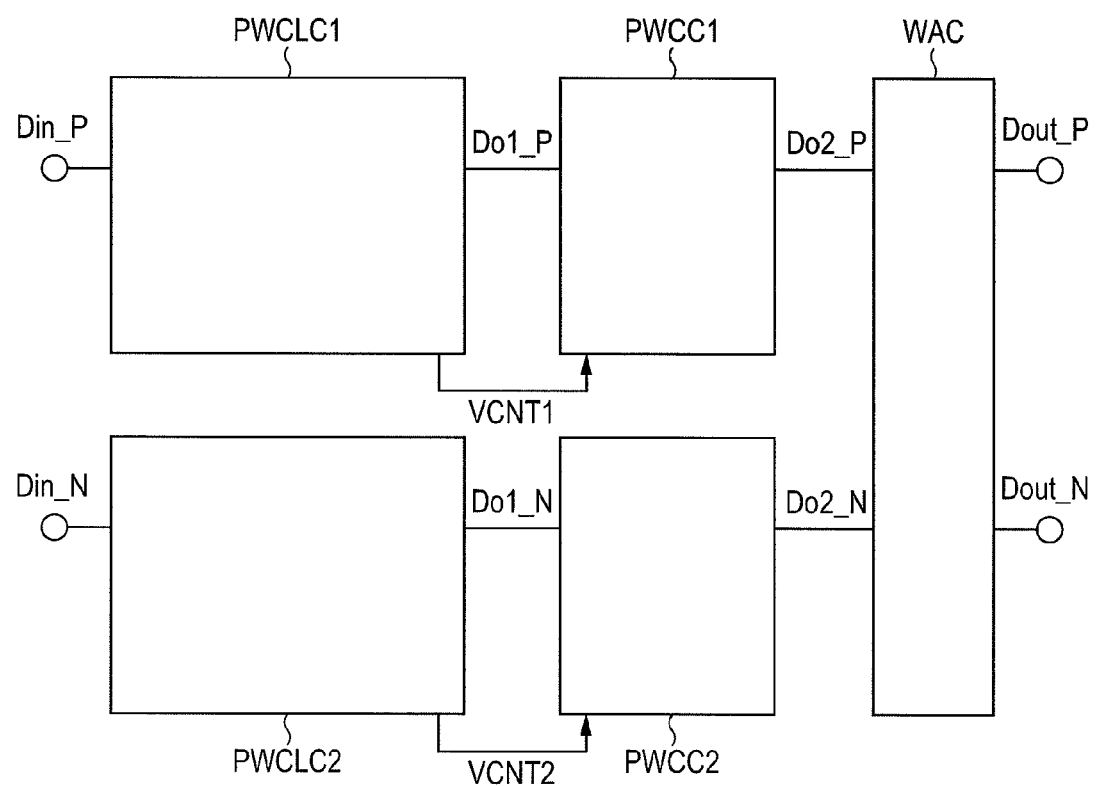
FIG. 1 is a block diagram showing a configuration of a waveform equalization circuit with pulse width modulation according to a first embodiment of the present invention byway of example.

The following preferred embodiments each are described after dividing each of the embodiments into a plurality of sections, or on an embodiment-by-embodiment basis for the sake of convenience, or where appropriate, however, it is to be understood that those are not unrelated to each other, and that one represents a variation, details, supplementary explanation, and so forth, in connection with a part or the whole of the other. Furthermore, with the following preferred embodiments, when element numbers, and so forth (including the number of pieces, a numerical value, quantity, scope, and so forth) are referred to, it is to be understood that the element numbers, and so forth be not limited to a specified number, and the element numbers, and so forth may be either more than, or less than the specified number except for the case where explicitly stated otherwise, the case where the element numbers, and so forth are obviously limited to the specified number on the basis of the principle, and so forth.

Still further, with each of the following preferred embodiments, it goes without saying that constituent elements thereof (including element steps, and so forth) be not necessarily essential except for the case where explicitly stated as essential, the case where they are considered essential on the basis of the principle, and so forth. Similarly, with each of the following preferred embodiments, when, for example, respective shapes of constituent elements, and positional relationship therebetween are referred to, it is to be understood that constituent elements effectively approximate, or analogous in shape and so forth thereto be included unless explicitly stated otherwise, and unless considered obviously otherwise on the basis of the principle.

There is no particular limitation to a circuit element as the constituent member of each functional block according to any embodiment of the present invention, and the circuit element is formed on a semiconductor substrate made of a single crystal silicon by use of the well known integrated circuit technology for a CMOS (Complementary MOS transistor). With the present embodiment, a MOS (metal Oxide Semiconductor) transistor is used as an example of a MISFET (Metal Insulator Semiconductor Field Effect Transistor). In the drawings, symbol ○ is affixed to a p-channel MOS transistor (PMOS transistor) so as to be differentiated from an n-channel MOS transistor (NMOS transistor). Further, in the drawings, connection of a substrate potential is not specified however, there is no particular limitation to a method for connection thereof.

The embodiments of the present invention are described hereinafter on the basis of the drawings. In all the drawings for illustrating the respective embodiments, members identical to each other are in principle denoted by like reference numerals, thereby omitting repetition in description.

First Embodiment

FIG. 1 is a block diagram showing a configuration of a waveform equalization circuit with pulse width modulation according to a first embodiment of the present invention by way of example. The waveform equalization circuit shown in FIG. 1 is comprised of pulse-width adjust-level generation circuits PWCLC1, PWCLC2, pulse-width adjustment circuits PWCC1, PWCC2, and a waveform shaping circuit WAC. Input data units Din_P, Din_N are inputted to the pulse-width adjust-level generation circuits PWCLC1, PWCLC2, respectively, to proceed therethrough, as they are, before being outputted as output data units Do1_P, Do1_N, respectively. Further, PWCLC1, PWCLC2 each monitor a consecutive bits count of an input data unit to thereby output pulse-width adjust-levels VCNT1, VCNT2, based on the results of monitoring, respectively. Upon PWCC1, PWCC2 receiving Do1_P, Do1_N, and VCNT1, VCNT2, respectively, PWCC1, PWCC2 output data units Do2_P, Do2_N, respectively, respective pulse-widths thereof being adjusted by setting delays corresponding to VCNT1, VCNT2, respectively. The waveform shaping circuit WAC solves unbalance between Do2_P, Do2_N before delivering output data units Dout_P, and Dout_N.

Figure 2:
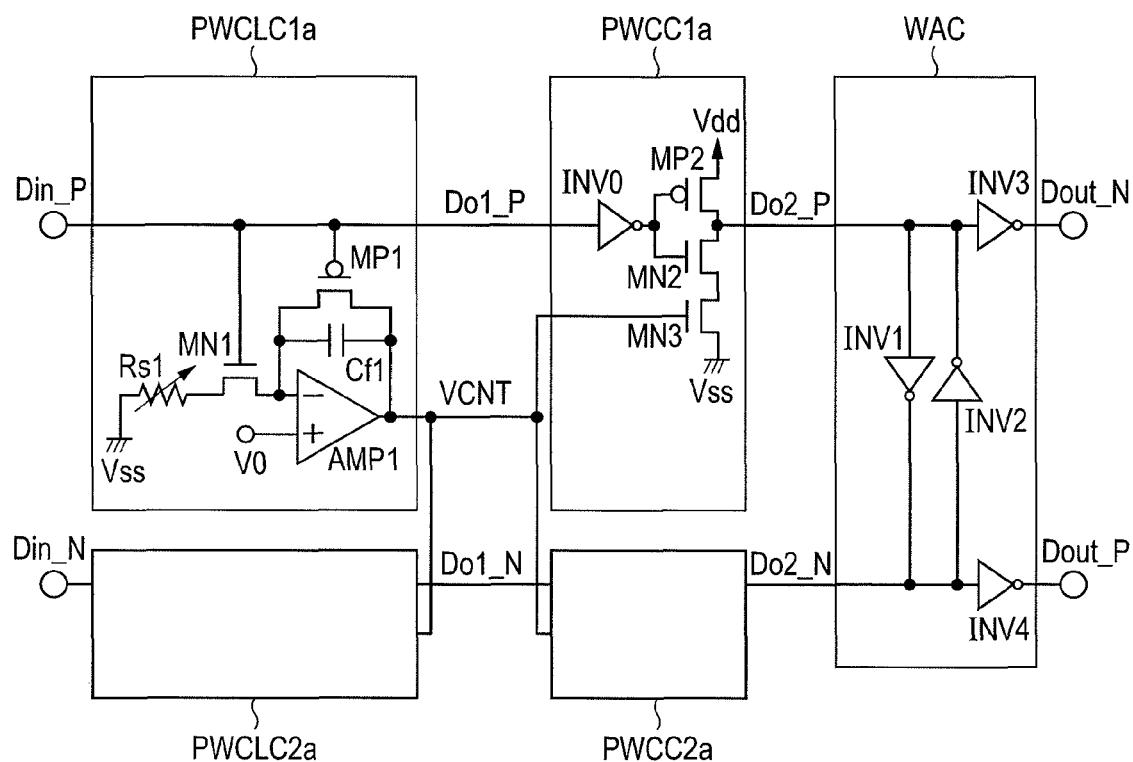
FIG. 2 is a circuit diagram showing an example of the detailed configurations of respective blocks of the waveform equalization circuit with pulse width modulation shown in FIG. 1.

FIG. 2 is a circuit diagram showing an example of the detailed configurations of respective blocks of the waveform equalization circuit with pulse width modulation shown in FIG. 1. A pulse-width adjust-level generation circuit PWCLC1$a$ shown in FIG. 2 is comprised of an op-amp AMP1, a capacitive element Cf1, a variable resistor Rs1, a PMOS transistor MP1, and an NMOS transistor MN1. The capacitive element Cf1 has one end connected to the minus (−) input node of AMP1, having the other end connected to the output node of AMP1. A reference voltage V0 is inputted to the plus (+) input node of AMP1. In this case, V0 is set to, for example, 0.5V. Either of the source•drain of MP1 is connected to the minus (−) input node of AMP1 while the other of the source•drain of MP1 is connected to the output node of AMP1, and the gate of MP1 is controlled by the input data unit Din_P. Either of the source•drain of MN1 is connected to one end of Rs1 while the other of the source•drain of MN1 is connected to the minus (−) input node of AMP1, and the gate of MN1 is controlled by Din_P. Rs1 has the other end grounded to a reference power supply voltage Vss.

Further, a pulse-width adjust-level generation circuit PWCLC2$a$ shown in FIG. 2 is identical in configuration to PWCLC1$a$ described as above except that the input data unit Din_N is substituted for the input data unit Din_P in the case of PWCLC1$a$, and detailed description of PWCLC2$a$ is therefore omitted. Herein, the output node of AMP1 of PWCLC1$a$, and the output node of AMP1 of PWCLC2$a$ are connected to a common connection node, and a pulse-width adjust-level VCNT is outputted from the common connection node. That is, in FIG. 2, there is adopted a configuration wherein VCNT1, VCNT2, shown in FIG. 1, are replaced with a common VCNT in order to enable both positive and negative systems for data inputting to be controlled by an identical circuit.

To put it briefly, PWCLC1$a$, PWCLC2$a$ each execute an operation for determining consecutive bits of an input data unit by switching of MP1, MN1, and accumulating charge corresponding to a consecutive bits count in Cf1 (the operation will be described in more detail later). AMP1 of PWCLC1$a$, and AMP1 of PWCLC2$a$ each have a configuration wherein an input level and an output level are varied by an action of Cf1, and the minus (−) input node side of AMP1 is at "L" level while the output node side of AMP1 is at "H" level. This is because PWCC1$a$, PWCC2$a$ (to be described later) each are of a configuration wherein VCNT is received by an NMOS transistor. It goes without saying that a configuration wherein VCNT is received by a PMOS transistor can be substituted for the configuration described as above.

The pulse-width adjustment circuit PWCC1a is comprised of an inverter INV0 to which the output data unit Do1_P from PWCLC1a is inputted, a PMOS transistor MP2, and an NMOS transistor MN2, provided in a stage succeeding the inverter INV0, both the transistors making up a CMOS inverter, and an NMOS transistor MN3. MP2 has a source connected to Vdd, and has a gate connected to the output node of NV0, having a drain connected to the output data unit Do2_P. Similarly, MN2 has a drain connected to the output data unit Do2_P, and has a gate connected to the output node of NV0, having a source connected to the drain of MN3. MN3 has a gate under control by the pulse-width adjust-level VCNT, and has a source grounded to the reference power supply voltage Vss. Herein, INV0 is, for example, a CMOS inverter.

Further, the pulse-width adjustment circuit PWCC2a is identical in configuration to PWCC1a described as above except that the output data units Do1_N, Do2_N are substituted for Do1_P, Do2_P, in the case of PWCC1a, respectively, and therefore, detailed description of PWCC2a is omitted. The operation current of MN2 is restricted according to a VCNT level inputted to MN3, whereupon delay time in a fall-operation of the CMOS inverter is varied (the operation of PWCC2a will be described in more detail later). In so doing, respective pulse-widths of Do2_P, and Do2_N are adjusted.

The waveform shaping circuit WAC is comprised of inverters INV1, INV2, INV3, and INV4. The inverter INV1 has an input connected to Do2_P, and has an output connected to Do2_N. The inverter INV2 has an input connected to Do2_N, and has an output connected to Do2_P. The inverter INV3 has an input connected to Do2_P, and has an output connected to Dout_N. The inverter INV4 has an input connected to Do2_N, and has an output connected to Dout_P. Thus, Do2_P is merged with Do2_N by the respective actions of INV1, INV2, thereby solving unbalance between Do2_P and Do2_N. The inverters INV1 to INV4 each are preferably made up of a CMOS inverter, and so forth in order to reduce power consumption.

Figure 3A:
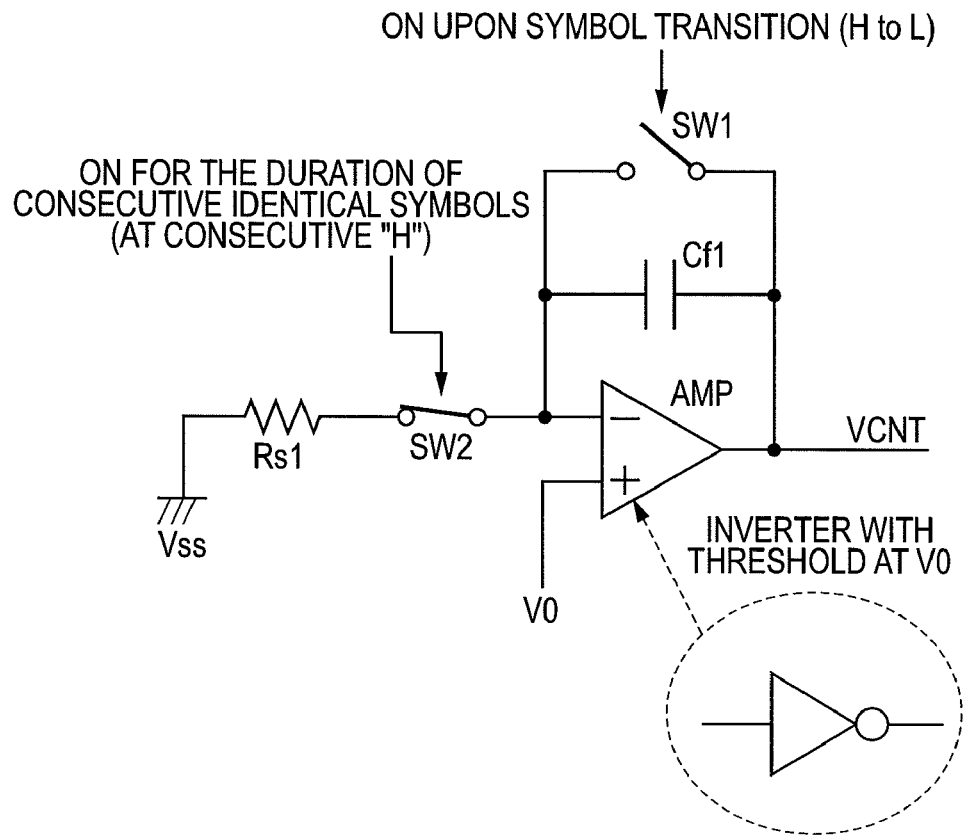
FIGS. 3A and 3B each show the operation principle of the pulse-width adjust-level generation circuit of the waveform equalization circuit with pulse width modulation shown in FIG. 2, FIG. 3A being an equivalent circuit diagram, and FIG. 3B being a schematic view showing transition of a pulse-width adjust-level against an input data unit.
Figure 3B:
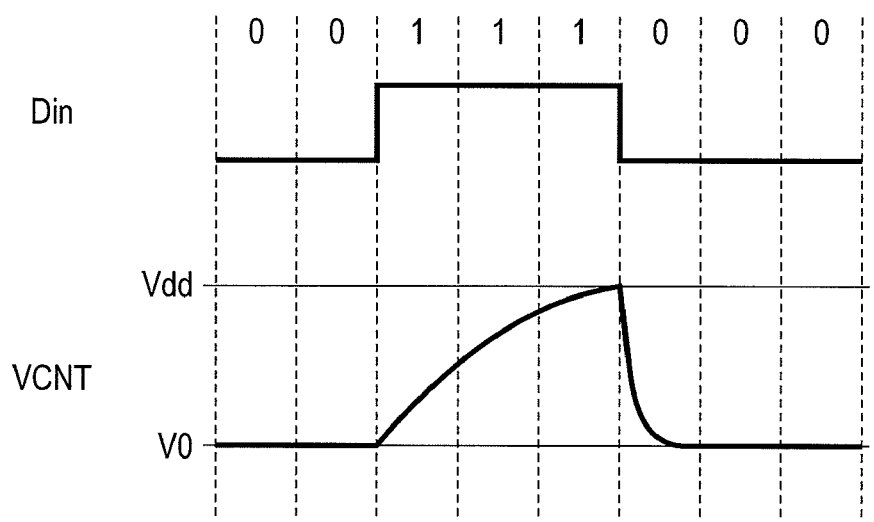

FIGS. 3A and 3B each show the operation principle of the pulse-width adjust-level generation circuit of the waveform equalization circuit with pulse width modulation shown in FIG. 2. FIG. 3A is an equivalent circuit diagram, and FIG. 3B is a schematic view showing transition of the pulse-width adjust-level VCNT against an input data unit. In FIG. 3A, MP1, MN1 of the pulse-width adjust-level generation circuit shown in FIG. 2 are expressed by switches SW1, SW2, respectively. Further, an op-amp AMP can be substituted for an inverter with threshold at V0. If, for example, a CMOS inverter, and so forth are substituted for that, lower power consumption can be aimed at.

Now, operation is described hereinafter. The operation of this circuit has two operation patterns, each pattern being dependent on an input data unit Din. First, if the input data unit Din is at "L", SW1 is turned ON, turning SW2 OFF. In doing so, short circuit occurs between the input and the output of AMP, whereupon AMP outputs a threshold potential (V0) that is a standard set value. Herein, as for V0 in the case of the inverter, V0=0.5 V when, for example, Vdd=1.0 V. Next, if the input data unit Din is at "H", SW2 is turned ON, turning SW1 OFF. In so doing, AMP has an input turned "L", and accumulates charge in Cf1 in an attempt to deliver "H" to the output thereof. Accordingly, an integration operation as shown in FIG. 3B is carried out, and the output VCNT of AMP will undergo variation in a range of V0 as the standard set value to Vdd according to time that SW2 is ON (=for the duration of consecutive input data units Din at "H").

Figure 4A:
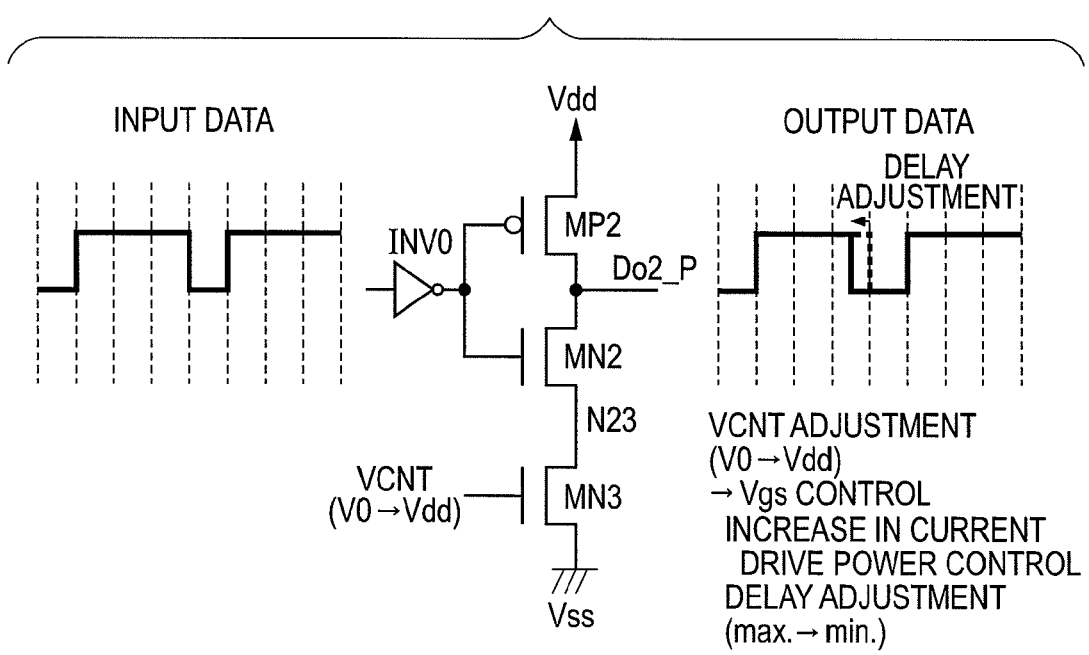
FIGS. 4A to 4C each show the operation principle of the pulse-width adjustment circuit of the waveform equalization circuit with pulse width modulation shown in FIG. 2, FIG. 4A being a block diagram showing the operation principle, FIG. 4B being a schematic representation showing a delay-adjusted output waveform of the pulse-width adjustment circuit, and FIG. 4C being a graph showing a control relationship between pulse-width adjust-level and delay adjust parameter.
Figure 4B:
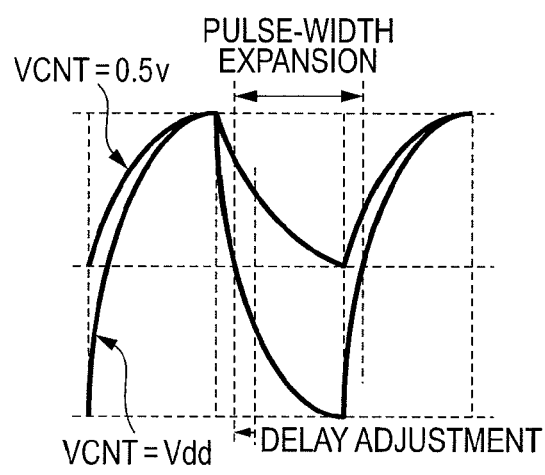
Figure 4C:
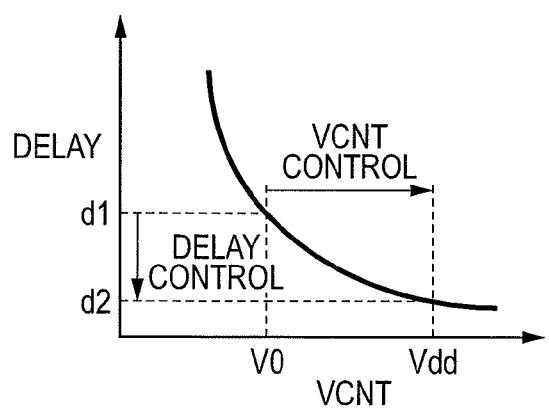

FIGS. 4A to 4C each show the operation principle of the pulse-width adjustment circuit of the waveform equalization circuit with pulse width modulation shown in FIG. 2. FIG. 4A is a block diagram showing the operation principle, FIG. 4B is a schematic representation showing a delay-adjusted output waveform of the pulse-width adjustment circuit, and FIG. 4C is a graph showing a control relationship between VCNT and delay adjustment parameter. As shown in FIG. 4A, the pulse-width adjustment circuit PWCC has a configuration wherein the NMOS transistor MN3 is added to the CMOS inverter (MP2, and MN2). Herein, a scheme is adopted whereby delay time in falling of the CMOS inverter is varied according to a pulse-width adjust-level VCNT inputted to MN3, thereby controlling the pulse width of an output waveform. The operation principle thereof is described hereunder.

First, if VCNT is at the maximum value (Vdd), Vdd is inputted to the gate of MN3, so that Vgs is large in value, and Vds of MN3 can be small in value against a current flowing at the time of discharge at the Do2_P node of MN2, whereupon an internal node N23 is at a low level to thereby enable MN2 to have large Vgs, and Vds, and a transistor drive power is therefore rendered large. On the other hand, if VCNT is at the minimum value (V0), V0 is inputted to the gate of MN3, so that Vgs is small in value, and Vds of MN3 can be large in value against a current flowing at the time of discharge at the Do2_P node of MN2, whereupon the internal node N23 is at a high level to thereby cause MN2 to have small Vgs, and Vds, and the transistor drive power is therefore rendered small.

Accordingly, if VCNT=V0 (0.5 V), a fall response of the CMOS inverter is delayed as compared with the case of VCNT=Vdd, as shown in FIG. 4B. As shown in FIG. 4C, the fall response speed (delay) of the CMOS inverter undergoes variation due to a difference in the VCNT level. By taking advantage of the difference (delay) in the fall response speed, a pulse width is controlled.

Figure 5:
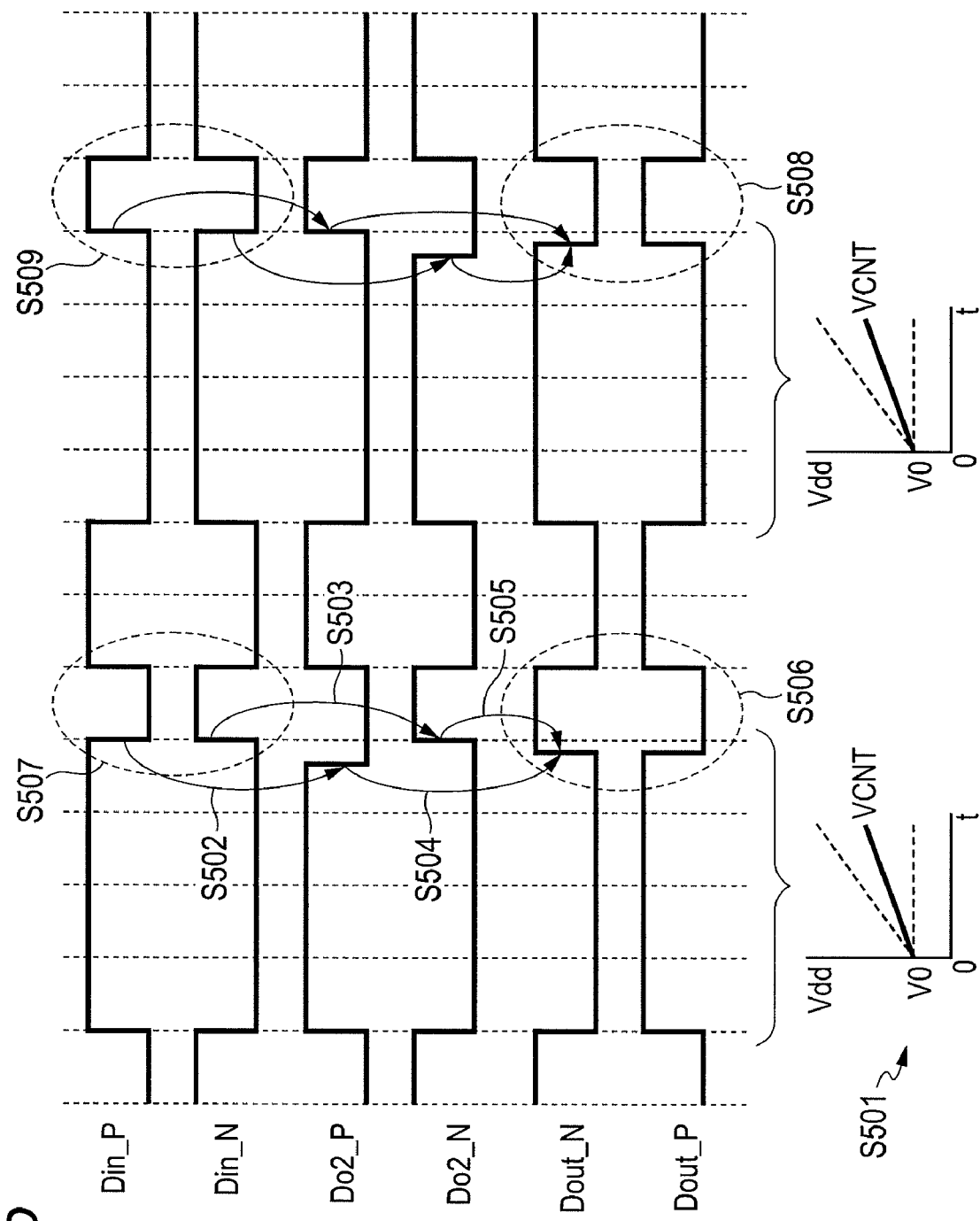
FIG. 5 is a waveform chart schematically showing the operation of the waveform equalization circuit with pulse width modulation shown in FIG. 2.

FIG. 5 is a waveform chart schematically showing the operation of the waveform equalization circuit with pulse width modulation shown in FIG. 2. With the waveform equalization circuit with pulse width modulation shown in FIG. 2, there is adopted a scheme whereby VCNT is controlled on the basis of the consecutive bits count of an input data unit, as described with reference to FIGS. 3A, 3B and FIGS. 4A to 4C, and the fall response of the CMOS inverter is controlled according to the VCNT level, thereby adjusting an output pulse-width. As shown in FIG. 5, for the duration of consecutive "H" levels of Din_P (the duration of consecutive "L" levels of Din_N), VCNT rises following averaging of the pulse-width adjust-level from PWCLC1a, and the pulse-width adjust-level from PWCLC2a (step S501). Thereafter, upon Din_P making a transition to "L" level, the output data unit Do2_P of PWCC1a falls in short delay time (step S502). At this pint in time, Din_N makes a transition to "H" level, however, with PWCC2a in FIG. 2, a rise speed remains constant regardless of VCNT, so that Do2_N rises in normal delay time (step S503).

Further, upon the pulse-width adjust-level generation circuit receiving the transition of, for example, Din_P, the output data unit Do2_P makes a transition, so that an actual anteroposterior relation between the respective edges of the data units differs on the actual time-axis from that shown in FIG. 5, however, an intention in this case is to describe a relationship in magnitude between the pulse widths, and FIG. 5 is a view intended for illustrating the relationship for the sake of convenience. The same can be said of FIGS. 10, 12, 14, and 16, referred to later on, respectively.

Thus, since adopted is the scheme for adjusting the output pulse-width by controlling the fall response of the CMOS inverter, an unbalanced relationship comes to exist between the positive waveform (Do2_P) and the negative waveform (Do2_N). The waveform shaping circuit WAC executes merger (averaging) of those unbalanced waveforms, thereby delivering the output data units Dout_P, Dout_N, balancing with each other (steps S504, S504). As a result, a pulse width (step S506) of each of Dout_P, and Dout_N, after the duration of consecutive "H" levels ("L" levels) of Dout_P (Dout_N) will end up expanded as compared with a pulse width (step S507) of each of the input data units Din_P, Din_N, corresponding to Dout_P, and Dout_N, respectively. Further, after the duration of consecutive "H" levels of Din_N (the duration of consecutive "L" levels of Din_P), contrary to the description as above, a pulse width of each of Dout_P, and Dout_N will similarly end up expanded (steps S508, S509).

FIG. 6 shows simulation waveforms obtained by conducting performance tests on the waveform equalization circuit with pulse width modulation shown in FIG. 2. It can be confirmed that VCNT underwent variation according to a bit pattern of an input data unit Din, and a pulse width of an output waveform underwent variation in response to VCNT. As shown in a region A surrounded by a broken line in the figure, in particular, it can be confirmed that for the duration of 5-consecutive bits of the input data unit Din, at "H" level, VCNT rose from 0.6 V to 0.8 V following the consecutive bits. Furthermore, it can be confirmed that a pulse width of an output data unit Dout was expanded upon falling after the consecutive bits.

Figure 7A:
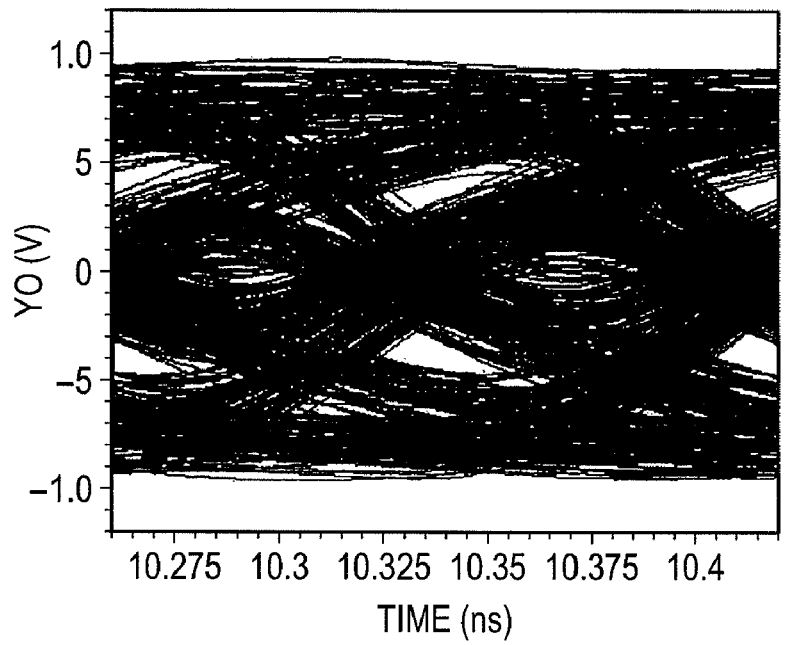
FIGS. 7A and 7B each show results of eye waveform simulation representing effects of waveform equalization executed by the waveform equalization circuit with pulse width modulation shown in FIG. 2, FIG. 7 (a) showing a simulated eye waveform without waveform equalization applied, and FIG. 7 (b) showing a simulated eye waveform with waveform equalization applied.
Figure 7B:
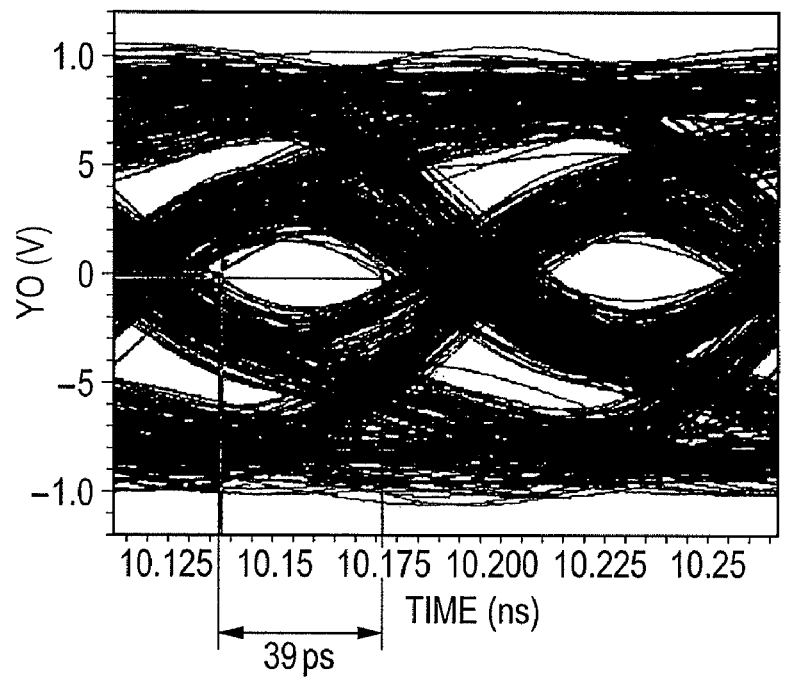

FIGS. 7A and 7B each show results of eye waveform simulation (conditions: transmission loss—14.8 dB, 6.25 GHz), as effects of waveform equalization executed by the waveform equalization circuit with pulse width modulation shown in FIG. 2. FIG. 7A shows a simulated eye waveform without waveform equalization applied, FIG. 7B showing a simulated eye waveform with waveform equalization applied. Thus, in the case of the simulated eye waveform without the waveform equalization applied, an eye is found fully closed, whereas an advantageous effect of the waveform equalization, such as an eye aperture width 39 ps, can be confirmed in the case of the simulated eye waveform with the waveform equalization applied. Thus, if charge that is based on the consecutive bits count of an input data unit is accumulated in the capacitive element, and a pulse-width is controlled according to an accumulation amount of the charge to thereby execute waveform equalization, this will enable a circuit scale to be downsized and the waveform equalization circuit to be made up of a CMOS circuit, so that advantageous effects of holding back power consumption to a low level can be gained.

Figure 19:
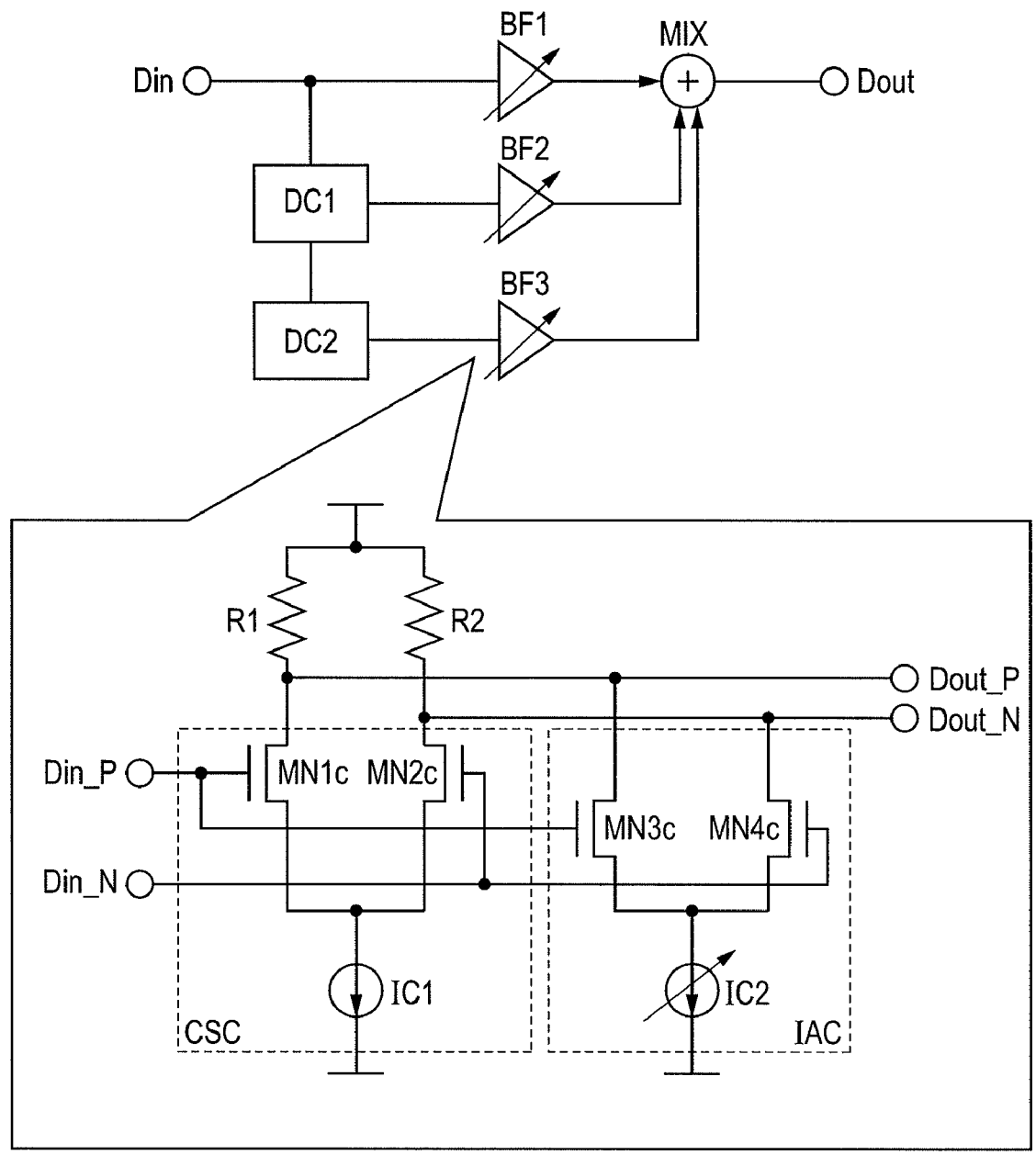
FIG. 19 is a schematic view showing a conventional waveform equalization method.

With the use of a pulse-width adjustable waveform equalization scheme according to the first embodiment, it becomes possible to attain reduction in power consumption in the case of, typically, the waveform equalization circuit. Such advantageous effects accrue from capability of the waveform equalization circuit at a small circuit scale as compared with a configuration example shown in FIG. 19 to implement waveform equalization. Furthermore, the advantageous effects can also accrue from use of the CMOS circuit instead of the CML circuit.

Second Embodiment

Figure 8:
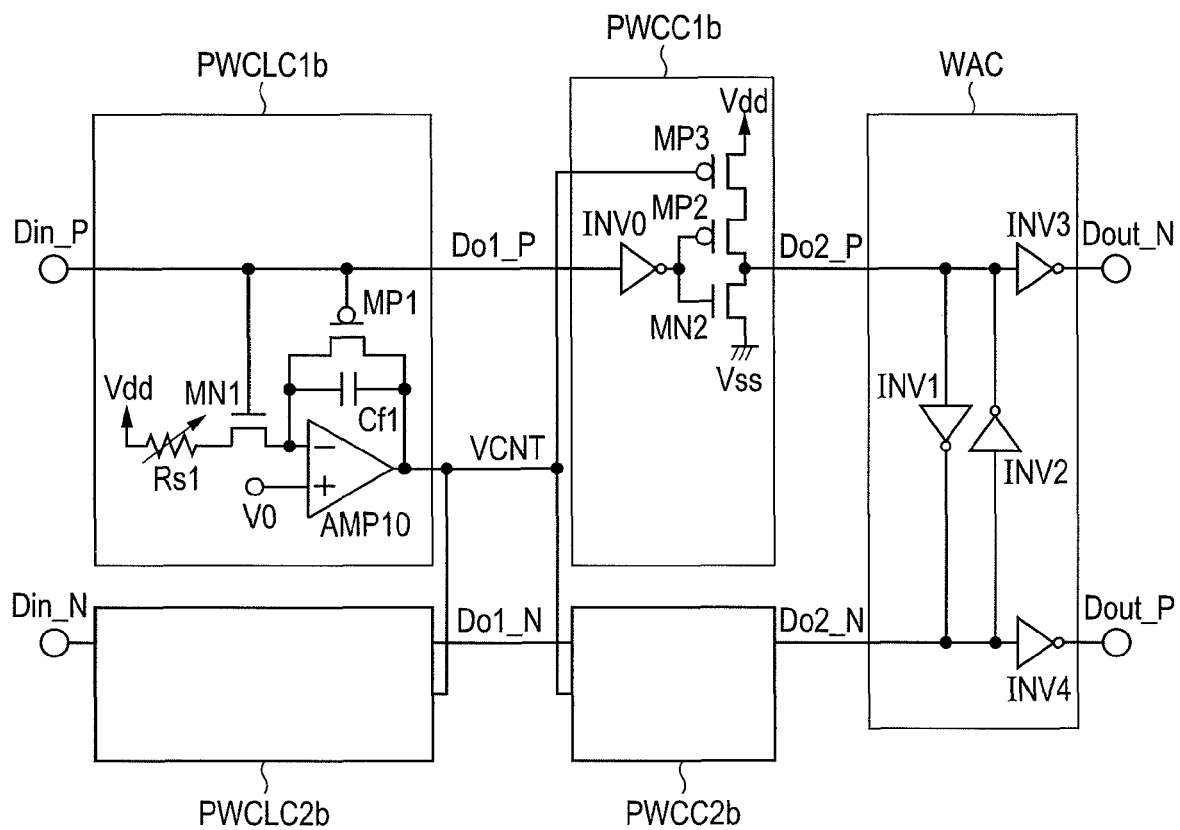
FIG. 8 is a circuit diagram showing another example of the detailed configurations of the respective blocks of the waveform equalization circuit with pulse width modulation shown in FIG. 1, in the case of a waveform equalization circuit with pulse width modulation according to a second embodiment of the present invention.

FIG. 8 is a circuit diagram showing another example of the detailed configurations of the respective blocks of the waveform equalization circuit with pulse width modulation shown in FIG. 1, in the case of a waveform equalization circuit with pulse width modulation according to a second embodiment of the present invention. Pulse-width adjust-level generation circuits PWCLC1b, PWCLC2b are identical in configuration to each other, each being comprised of an op-amp AMP10, a capacitive element Cf1, a variable resistor Rs1, a PMOS transistor MP1, and an NMOS transistor MN1. The Pulse-width adjust-level generation circuits PWCLC1b, PWCLC2b, according to the second embodiment of the present invention, differ in configuration from those according to the first embodiment of the present invention, shown in FIG. 2, only in respect of where Rs1 is connected. The second embodiment of the present invention is identical to the first embodiment of the present invention in respect of other aspects of configuration, and connective relationship. As is the case with the pulse-width adjust-level generation circuits shown in FIG. 2, the output node of AMP10 of PWCLC1b, and the output node of AMP10 of PWCLC2b are connected to a common connection node, and a pulse-width adjust-level VCNT is generated at the common connection node.

With PWCLC1b, PWCLC2b shown in FIG. 8, Rs1 has one end connected a source of MN1, and has the other end connected to Vdd. In operation, determination of consecutive bits of an input data unit is made by switching of MP1, MN1, and charge is accumulated in Cf1 although the operation will be described in more detail later. AMP10 of PWCLC1b, and AMP10 of PWCLC2b each have a configuration wherein an input level and an output level each undergoes variation by an action of Cf1, and the minus (−) input node side of AMP10 is at "H" level while the output node side of AMP10 is at "L" level. This is because VCNT delivered to PWCC1b, PWCC2b (to be described later), respectively, is received by a PMOS transistor.

The pulse-width adjustment circuit PWCC1b is comprised of an inverter INV0 to which the output data unit Do1_P from PWCLC1b is inputted, a PMOS transistor MP2, and an NMOS transistor MN2, provided in a stage succeeding the inverter INV0, both the transistors making up a CMOS inverter, and a PMOS transistor MP3. MP2, as a constituent member of the inverter, has a source connected to the drain of MP3, and has a gate connected to the output node of INV0, having a drain connected to an output data unit Do2_P. MN2 has a drain connected to the output data unit Do2_P, and has a gate connected to the output node of INV0, having a source connected to Vss. MP3 has a gate connected to VCNT, and has a source connected to Vdd. Further, the pulse-width adjustment circuit PWCC2b is identical in configuration to PWCC1b described as above except that Do1_N, Do2_N are substituted for Do1_P, Do2_P, in the case of PWCC1b, respectively, and therefore, detailed description of PWCC2b is omitted. The operation current of MP2 is restricted according to a VCNT level inputted to MP3, whereupon delay time in a fall-operation of the CMOS inverter undergoes variation (the operation of PWCC2b will be described in more detail later). In so doing, respective pulse-widths of Do2_P, and Do2_N are adjusted.

The waveform shaping circuit WAC shown in FIG. 8 is identical in circuit configuration to WAC according to the first embodiment of the present invention, shown in FIG. 2, and Do2_P is merged with Do2_N by actions of the respective inverters INV1, INV2, thereby solving unbalance existing between Do2_P and Do2_N.

The operation principle of the pulse-width adjust-level generation circuits PWCLC1b, PWCLC2b of the waveform equalization circuit with pulse width modulation shown in FIG. 8 is the same as that described with reference to FIG. 3 except that a connection destination of one end of the variable resistor Rs1 is changed from Vss (in the case of FIG. 3) to Vdd. The operation of this circuit has two operation patterns, each pattern being dependent on an input data unit. Referring to FIG. 3, if the input data unit is first at "L", SW1 is turned ON, turning SW2 OFF. In so doing, short circuit occurs between the input and the output of AMP, whereupon AMP outputs the threshold potential V0 that is the standard set value. Herein, as for V0 in the case of the inverter, V0=0.5 V when, for example, Vdd=1.0 V. Next, if f the input data unit is at "H", SW2 is turned ON, turning SW1 OFF. In so doing, charge is accumulated in Cf1 such that AMP has the input turned "H", and AMP attempts to output "L". Accordingly, the integration operation as shown in FIG. 3B is carried out, and an output level VCNT of AMP undergoes variation in a range of V0 that is the standard set value to 0 V (Vss) according to time that an AMP input is at consecutive "H" (input data units at consecutive "H").

Figure 9A:
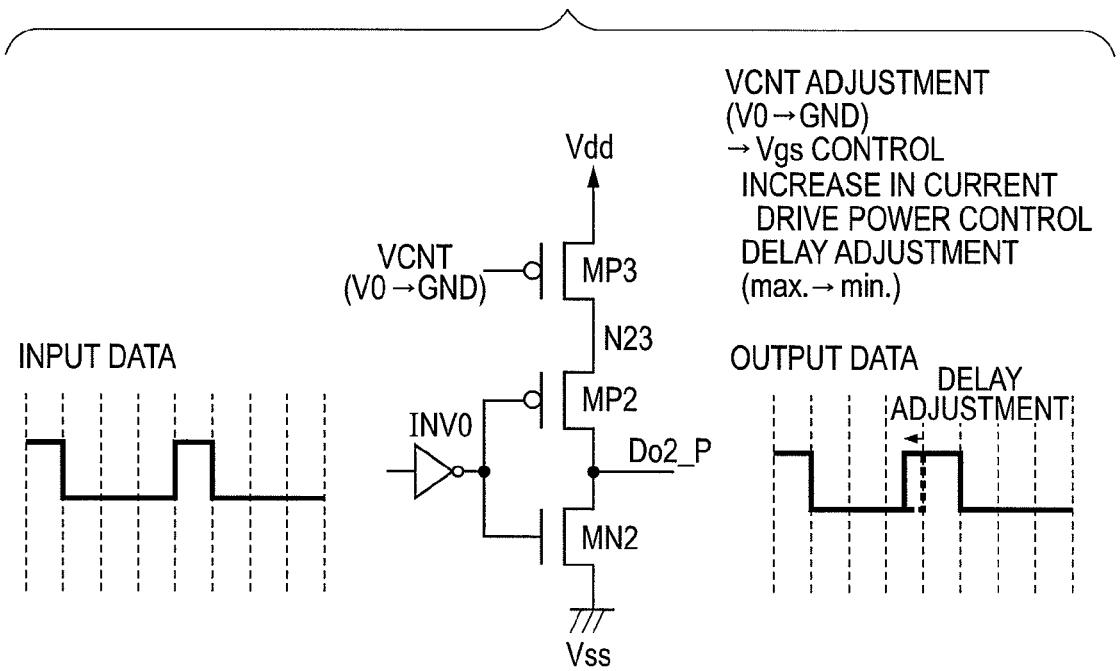
FIGS. 9A to 9C each show the operation principle of the pulse-width adjustment circuit PWCC of the waveform equalization circuit with pulse width modulation shown in FIG. 8, FIG. 9A being a block diagram showing the operation principle of pulse-width adjustment, FIG. 9B being a schematic representation showing a delay-adjusted output waveform, and FIG. 9C being a graph showing a control relationship between pulse-width adjust-level and delay adjust parameter.
Figure 9B:
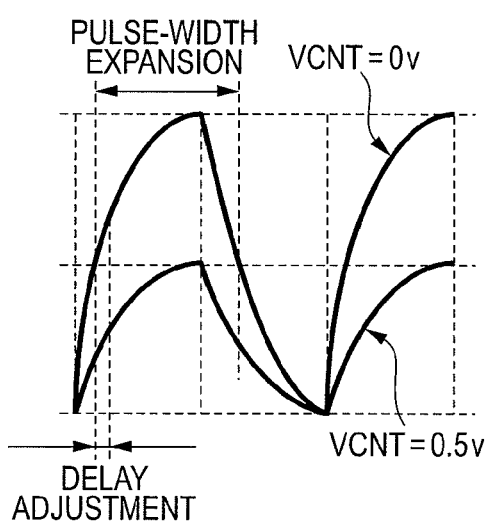
Figure 9C:
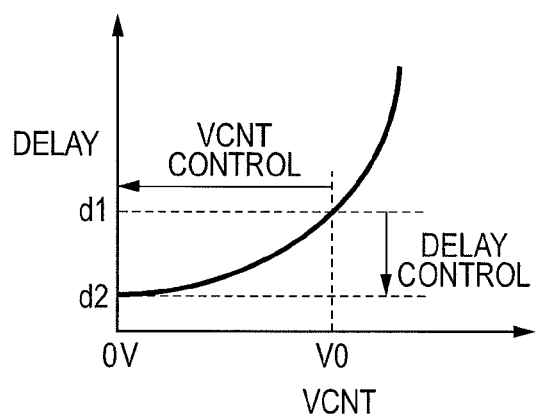

FIGS. 9A to 9C each show the operation principle of the pulse-width adjustment circuit PWCC of the waveform equalization circuit with pulse width modulation shown in FIG. 8. FIG. 9A is a block diagram showing the operation principle, FIG. 9B is a schematic representation showing a delay-adjusted output waveform of the pulse-width adjustment circuit, and FIG. 9C is a graph showing a control relationship between VCNT and delay adjustment parameter. As shown in FIG. 9A, the pulse-width adjustment circuit PWCC has a configuration wherein the PMOS transistor MP3 is added to the CMOS inverter (MP2, and MN2). Herein, a scheme is adopted whereby delay time in rising of the CMOS inverter is varied according to a pulse-width adjust-level VCNT inputted to MP3, thereby controlling the pulse width of an output waveform. The operation principle thereof is described hereunder.

First, if VCNT is at the minimum value (0 V), 0 V is inputted to the gate of MP3, so that Vgs is large in value, and Vds of MP3 can be small in value against a current flowing at the time of discharge at the Do2_P node of MP2, whereupon an internal node N23 is at a high level to thereby enable MP2 to have large Vgs, and Vds, and a transistor drive power is therefore rendered large. On the other hand, if VCNT is at the maximum value (V0), V0 is inputted to the gate of MP3, rendering Vgs small in value, and Vds of MP3 can be large in value against the current flowing at the time of discharge at the Do2_P node of MP2, so that the internal node N23 is at a low level to thereby cause MP2 to have small Vgs, and Vds, and the transistor drive power is therefore rendered small. Accordingly, if VCNT=V0 (0.5 V), a rise response of the CMOS inverter is delayed as compared with the case of VCNT=0 V, as shown in FIG. 9B. As shown in FIG. 9C, a rise response speed (delay) of the CMOS inverter undergoes variation due to a difference in the VCNT level. By taking advantage of the difference (delay) in the response speed, a pulse width is controlled.

Figure 10:
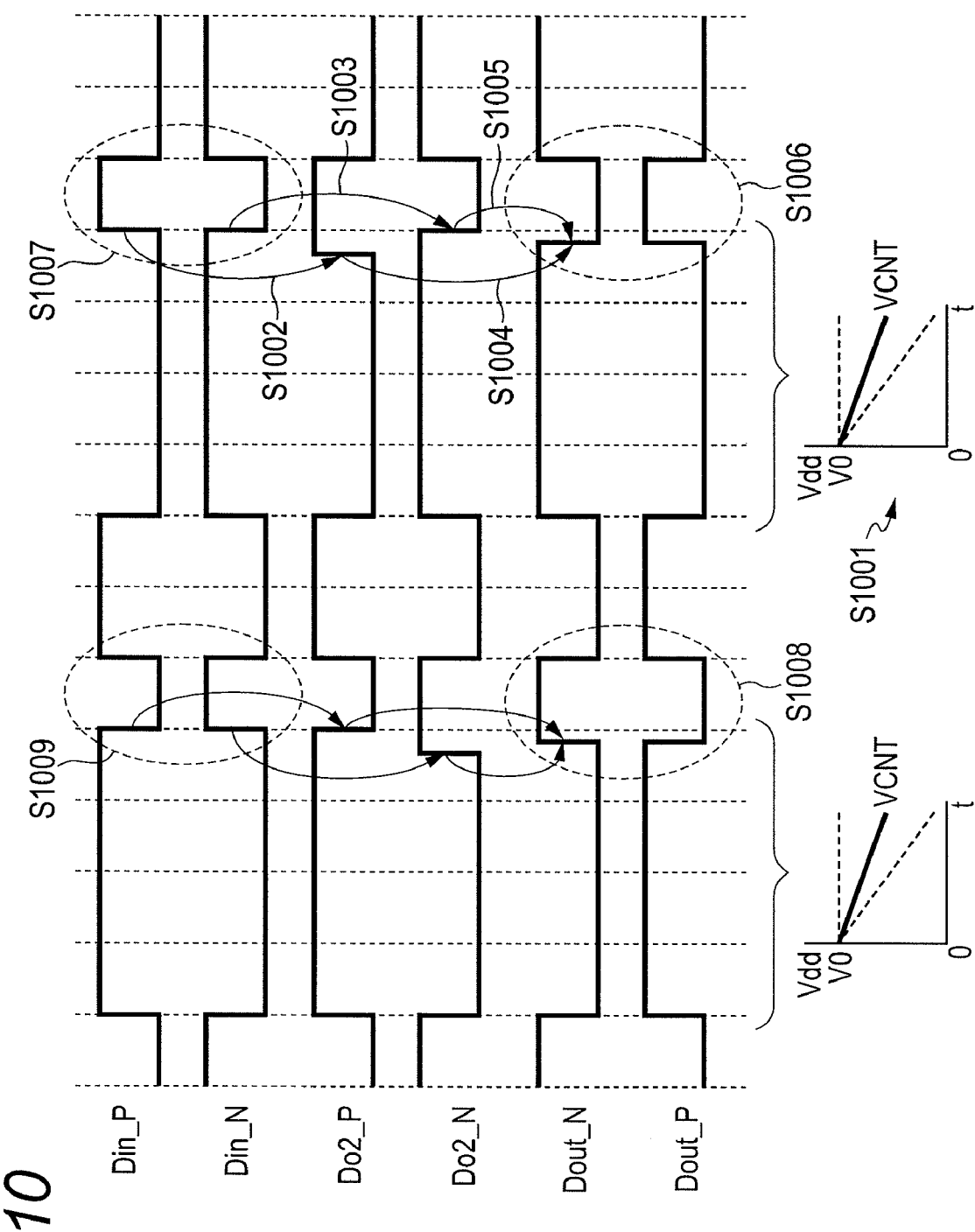
FIG. 10 is a waveform chart schematically showing the operation of the waveform equalization circuit with pulse width modulation shown in FIG. 8.

FIG. 10 is a waveform chart schematically showing the operation of the waveform equalization circuit with pulse width modulation shown in FIG. 8. With the waveform equalization circuit with pulse width modulation shown in FIG. 8, a scheme is adopted whereby VCNT is controlled on the basis of a consecutive bits count of an input data unit, and a rise response of the CMOS inverter is controlled according to the VCNT level, unlike the case of the waveform equalization circuit shown in FIG. 2, thereby adjusting an output pulse-width.

As shown in FIG. 10, for the duration of consecutive "L" levels of Din_P (the duration of consecutive "H" levels of Din_N), VCNT falls following averaging of the pulse-width adjust-level from PWCLC1b, and the pulse-width adjust-level from PWCLC2b (step S1001). Thereafter, upon Din_P making a transition to "H" level, an output data unit Do2_P of PWCC1b rises in short delay time (step S1002). At this pint in time, Din_N makes a transition to "L" level, however, with PWCC2b in FIG. 8, a fall speed remains constant regardless of VCNT, so that Do2_N falls in normal delay time (step S1003).

Thus, the scheme is adopted whereby the output pulse-width is adjusted by controlling the rise response of the CMOS inverter as described in the foregoing, an unbalanced relationship comes to exist between the positive waveform (Do2_P) and the negative waveform (Do2_N). The waveform shaping circuit WAC executes merger (averaging) of those unbalanced waveforms, thereby delivering the output data units Dout_P, and Dout_N, balancing with each other (steps S1004, S1005). As a result, a pulse width (step S1006) of each of Dout_P, and Dout_N, after the duration of consecutive "L" levels ("H" levels) of the output data units Dout_P, Dout_N will end up expanded as compared with a pulse width (step S1007) of each of the input data units Din_P, Din_N, corresponding to Dout_P, and Dout_N, respectively. Further, after the duration of the consecutive "L" levels of Din_N (the duration of the consecutive "H" levels of Din_P), contrary to the description as above, a pulse width of each of Dout_P, and Dout_N will similarly end up expanded (steps S1008, S1009).

Thus, if charge that is based on a consecutive bits count of an input data unit is accumulated in a capacitive element by use of a pulse-width adjustable waveform equalization scheme according to the second embodiment, and a pulse-width is controlled according to an accumulation amount of the charge to thereby execute waveform equalization, it becomes possible to attain reduction in power consumption in the case of, typically, the waveform equalization circuit as is the case with the first embodiment.

Third Embodiment

Figure 11:
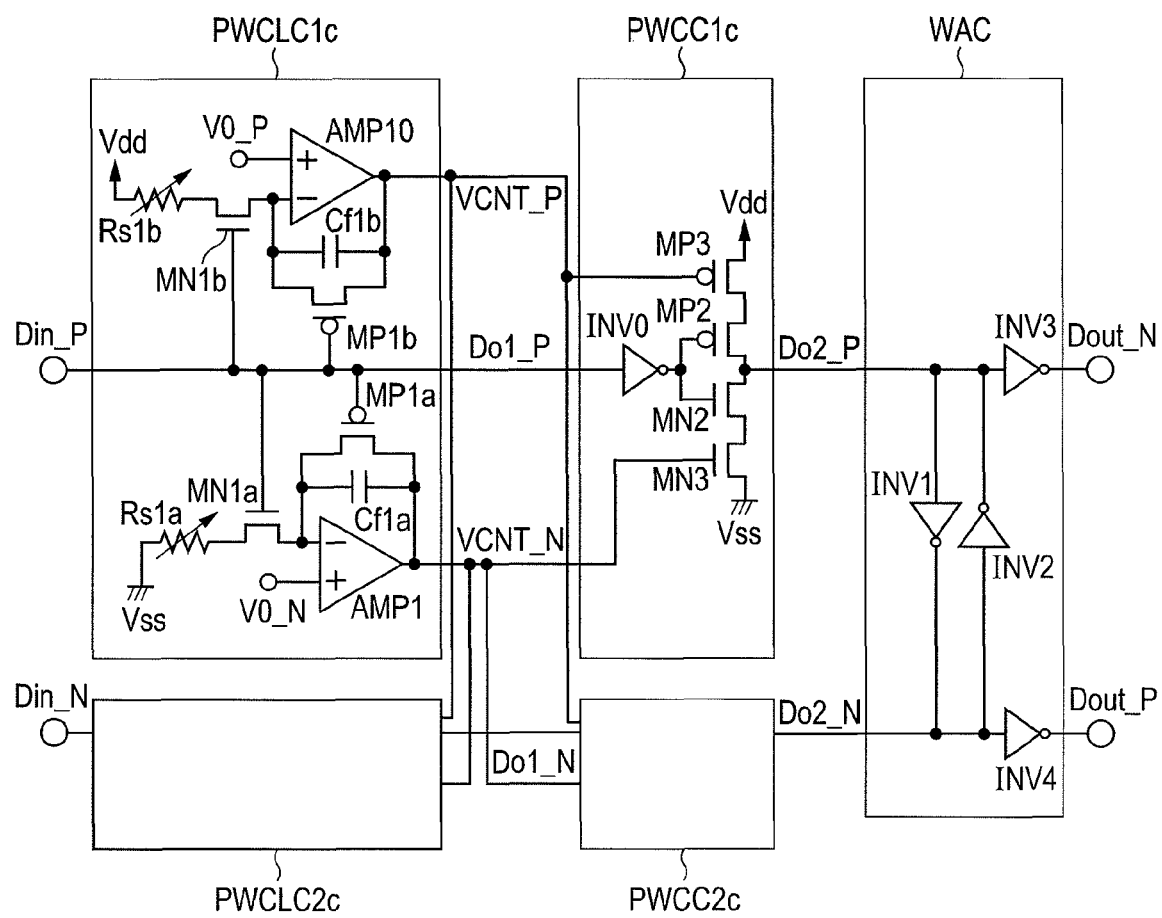
FIG. 11 is a circuit diagram showing still another example of the detailed configurations of the respective blocks of the waveform equalization circuit with pulse width modulation shown in FIG. 1, in the case of a waveform equalization circuit with pulse width modulation according to a third embodiment of the present invention.

FIG. 11 is a circuit diagram showing still another example of the detailed configurations of the respective blocks of the waveform equalization circuit with pulse width modulation shown in FIG. 1, in the case of a waveform equalization circuit with pulse width modulation according to a third embodiment of the present invention. Pulse-width adjust-level generation circuits PWCLC1c, PWCLC2c, shown in FIG. 11, are identical in configuration to each other, each being comprised of op-amps AMP1, AMP10, capacitive elements Cf1a, Cf1b, variable resistors Rs1a, Rs1b, PMOS transistors MP1a MP1b, and NMOS transistor MN1a, MN1b. PWCLC1c, PWCLC2c each has a configuration wherein both the circuit according the first embodiment, and the circuit according to the second embodiment are provided. The output of AMP10 in PWCLC1c, and the output of AMP10 in PWCLC2c are connected to a common connection node, generating a pulse-width adjust-level VCNT_P while the output of AMP1 in PWCLC1c, and the output of AMP1 in PWCLC2c are connected to a common connection node, generating a pulse-width adjust-level VCNT_N.

First, in a line of PWCLC1c for generating VCNT_N, Cf1a has one end connected to the minus (−) input node of AMP1, and has the other end connected to the output node (VCNT_N) of AMP1. A reference voltage V0_N is inputted to the plus (+) input node of AMP1. In this case, for example, V0_N=0.5 V is set. Either of the source•drain of MP1a is connected to the minus (−) input node of AMP1, and has the other of the source•drain of MP1a is connected to the output node (VCNT_N) of AMP1 while the gate of MP1a is connected to an input data unit Din_P. MN1a has either of the source•drain, connected to one end of Rs1a, and has the other of the source•drain, connected to the minus (−) input node of AMP1 while the gate of MN1a is connected to the input data unit Din_P. The other end of Rs1a is grounded.

In operation, determination on consecutive bits of an input data unit is made by switching of MP1a, MN1a, and charge is accumulated in Cf1a (the operation will be described in detail later). AMP1 has a configuration wherein an input level and an output level each undergo variation by an action of Cf1a, and the minus (−) input node side of AMP1 is at "L" level while the output node side of AMP1 is at "H" level. This is because PWCC1c, PWCC2c (to be described later) each are made up such that VCNT_N is received by an NMOS transistor.

Then, in a line of PWCLC1c, for generating VCNTP, Cf1b has one end connected to the minus (−) input node of AMP10, and has the other end connected to the output node (VCNT_P) of AMP10. A reference voltage V0_N is inputted to the plus (+) input node of AMP10. In this case, for example, V0_P=0.5 V is set. Either of the source•drain of MP1b is connected to the minus (−) input node of AMP10, and the other of the source•drain of MP1b is connected to the output node (VCNT_P) of AMP10 while the gate of MP1b is connected to the input data unit Din_P. MN1b has either of the source•drain, connected to one end of Rs1b, and has the other of the source•drain, connected to the minus (−) input node of AMP10 while the gate of MN1b is connected to the input data unit Din_P. The other end of Rs1b is connected to Vdd.

In operation, determination on the consecutive bits of the input data unit is made by switching of MP1b, MN1b, and charge is accumulated in Cf1b (the operation will be described in detail later). Further, AMP10 has a configuration wherein an input level and an output level each undergo variation by an action of Cf1b, and the minus (−) input node side of AMP1 is at "H" level while the output node side of AMP10 is at "L" level. This is because the pulse-width adjustment circuits PWCC1c, PWCC2c each are made up such that VCNT_P is received by a PMOS transistor. Further, PWCLC2c is identical in configuration to PWCLC1c except that Din_P is substituted for Din_N.

The pulse-width adjustment circuit PWCC1c is comprised of an inverter INV0 to which the output data unit Do1_P from PWCLC1c is inputted, a PMOS transistor MP2, and an NMOS transistor MN2, provided in a stage succeeding the inverter INV0, both the transistors making up a CMOS inverter, a PMOS transistor MP3, and an NMOS transistor MN3. MP2, as a constituent member of the CMOS inverter, has a source connected to the drain of MP3, and has a gate connected to the output node of INV0, having a drain connected to an output data unit Do2_P. MN2 has a drain connected to the output data unit Do2_P, and has a gate connected to the output node of INV0, having a source connected to the drain of MN3. MP3 has a gate connected to VCNT_P, and has a source connected to Vdd. MN3 has a gate connected to VCNT_N, and has a source connected to Vss.

In operation, the operation current of MP2 is restricted according to a VCNT_P level inputted to MP3 (the operation will be described in more detail later), whereupon delay time in a rise-operation of the CMOS inverter undergoes variation. Further, the operation current of MN2 is restricted according to a VCNT_N level inputted to MN3, whereupon delay time in a fall-operation of the CMOS inverter undergoes variation. In so doing, the respective pulse-widths of Do2_P, and Do2_N are adjusted.

The waveform shaping circuit WAC shown in FIG. 11 is a circuit identical in configuration to WAC according to the first embodiment of the present invention, and Do2_P is merged with Do2_N by the respective actions of INV1, INV2, thereby solving unbalance between Do2_P and Do2_N. Further, since the rise-operation, and the fall-operation are similarly controlled as described above, unbalance between waveforms is insusceptible to occur, and WAC may therefore be dispensed with. The operation principle of the pulse-width adjust-level generation circuit of the waveform equalization circuit with pulse width modulation shown in FIG. 11 is the same as that described with reference to the first and second embodiments of the present invention, respectively. Furthermore, the operation principle of the pulse-width adjustment circuit of the waveform equalization circuit with pulse width modulation shown in FIG. 11 is also the same as that described with reference to the first and second embodiments of the present invention, respectively.

Figure 12:
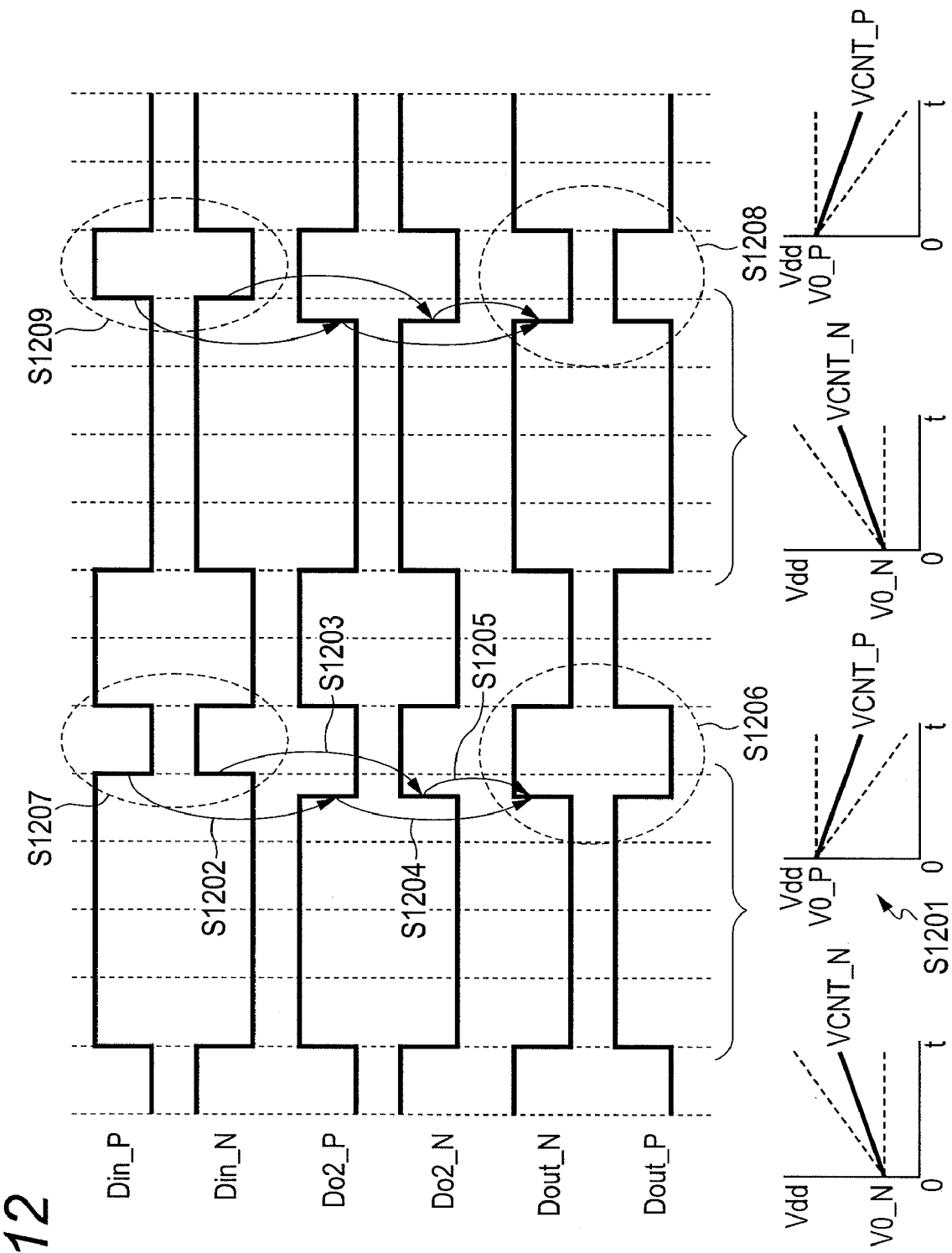
FIG. 12 is a waveform chart schematically showing the operation of the waveform equalization circuit with pulse width modulation shown in FIG. 11.

FIG. 12 is a waveform chart schematically showing the operation of the waveform equalization circuit with pulse width modulation shown in FIG. 11. With the waveform equalization circuit with pulse width modulation shown in FIG. 11, a scheme is adopted whereby VCNT_P, VCNT_N each are controlled on the basis of a consecutive bits count of an input data unit, and rise response and fall response of the CMOS inverter are controlled according to the respective VCNT levels, thereby adjusting an output pulse-width. As shown in FIG. 12, for the duration of consecutive "H" levels of Din_P (the duration of consecutive "L" levels of Din_N), VCNT_N rises while VCNT_P rises, following averaging of a pulse-width adjust-level from PWCLC1c, and a pulse-width adjust-level from PWCLC2c, (step S1201). Thereafter, upon Din_P making a transition t level, an output data unit Do2_P of PWCC1c falls in short delay time (step S1202). At this pint in time, Din_N makes a transition to "H" level, an output data unit Do2_N of PWCC2c also rises in short delay time (step S1203).

The waveform shaping circuit WAC executes merger (averaging) of the fall of Do2_P and the rise of Do2_N, thereby delivering the output data units Dout_P, Dout_N, balancing with each other (steps S1204, S1205). As a result, a pulse width (step S1206) of each of Dout_P, and Dout_N, after the duration of consecutive "H" levels ("L" levels), will end up expanded as compared with a pulse width (step S1207) of each of the input data units Din_P, Din_N, corresponding to Dout_P, and Dout_N, respectively. The degree of expansion in the pulse width will be greater as compared with those shown in FIGS. 5, 10, respectively. Further, after the duration of consecutive "H" levels of Din_N (the duration of consecutive "L" levels of Din_P), contrary to the description as above, a pulse width of each of Dout_P, and Dout_N will similarly end up expanded (steps S1208, S1209). Further, since both Do2_P and Do2_N make transition in short delay time, unlike the cases shown in FIGS. 5, 10, respectively, there is no particular necessity for WAC. However, if the merger is executed by WAC, this will enable a potential difference in operation speed between the PMOS transistor MP1, and the NMOS transistor, an error due to process variation, and so forth to be absorbed to some extent.

Thus, if charge that is based on a consecutive bits count of an input data unit is accumulated in a capacitive element by use of a pulse-width adjustable waveform equalization scheme according to the third embodiment, and a pulse-width is controlled according to an accumulation amount of the charge to thereby execute waveform equalization, it becomes possible to attain reduction in power consumption in the case of, typically, the waveform equalization circuit, as is the respective cases with the first embodiment and the second embodiment.

Fourth Embodiment

Figure 13:
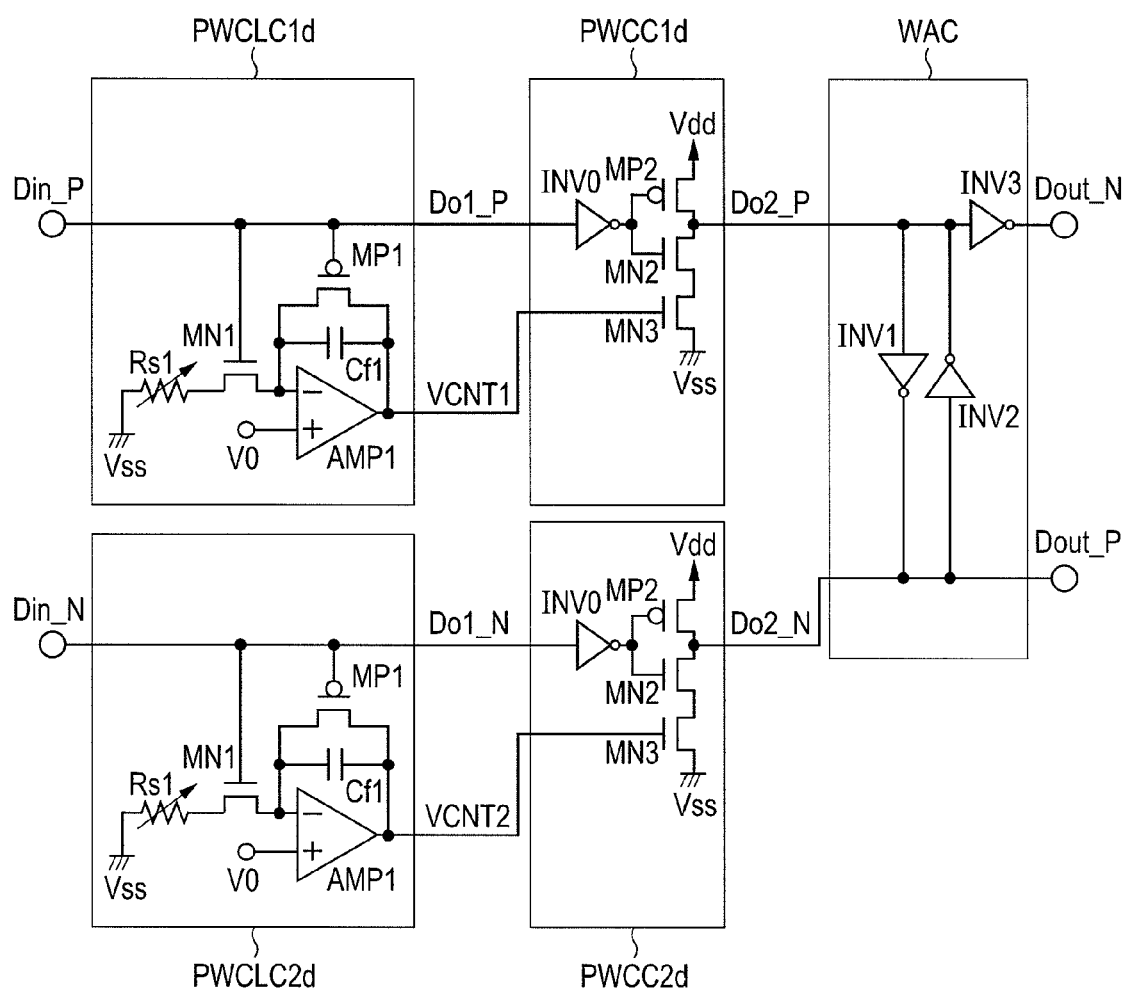
FIG. 13 is a circuit diagram showing a further example of the detailed configurations of the respective blocks of the waveform equalization circuit with pulse width modulation shown in FIG. 1, in the case of a waveform equalization circuit with pulse width modulation according to a fourth embodiment of the present invention.

FIG. 13 is a circuit diagram showing a further example of the detailed configurations of the respective blocks of the waveform equalization circuit with pulse width modulation shown in FIG. 1, in the case of a waveform equalization circuit with pulse width modulation according to a fourth embodiment of the present invention. The waveform equalization circuit with pulse width modulation shown in FIG. 13 is comprised of pulse-width adjust-level generation circuits PWCLC1d, PWCLC2d, pulse-width adjustment circuits PWCC1d, PWCC2d, and a waveform shaping circuit WAC.

The respective circuits described as above are identical in internal configuration to those circuits shown in FIG. 2, such as the pulse-width adjust-level generation circuits PWCLC1a, PWCLC2a, the pulse-width adjustment circuits PWCC1a, PWCC2a, and the waveform shaping circuit WAC. However, PWCLC1a shown in FIG. 2 has a configuration wherein the output of AMP1 of PWCLC1a, and the output of AMP1 of PWCLC2a are connected to the common connection node, and the pulse-width adjust-level VCNT is outputted from the common connection node, whereas PWCLC1d, PWCLC2d, shown in FIG. 13, are made up such that pulse-width adjust-levels VCNT1, VCNT2 are generated from the output of AMP1 of PWCLC1d, and the output of AMP1 of PWCLC2d, respectively. VCNT1 is connected to the gate of MN3 of PWCC1d, and VCNT2 is connected to the gate of MN3 of PWCC2d. Otherwise, circuit configurations are identical to those shown in FIG. 2, omitting therefore detailed description thereof.

Figure 14:
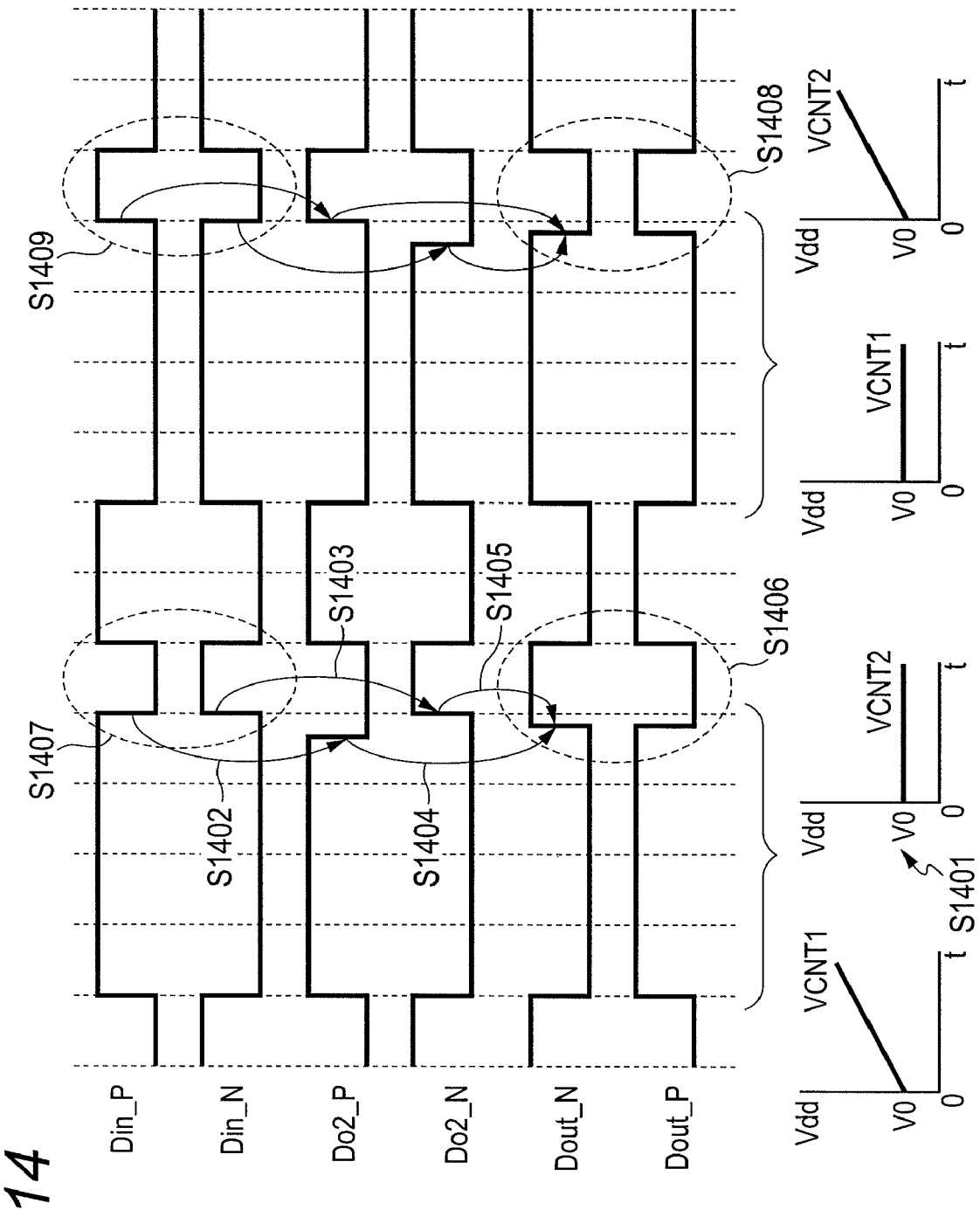
FIG. 14 is a waveform chart schematically showing the operation of the waveform equalization circuit with pulse width modulation shown in FIG. 13.

FIG. 14 is a waveform chart schematically showing the operation of the waveform equalization circuit with pulse width modulation shown in FIG. 13. As shown in FIG. 14, for the duration of consecutive "H" levels of Din_P (the duration of consecutive "L" levels of Din_N), VCNT1 from PWCLC1d rises while VCNT2 from PWCLC2d is kept at a constant value (V0) (step S1401). Thereafter, upon Din_P making a transition to "L" level, an output data unit Do2_P of PWCC1d falls in short delay time (step S1402). At this pint in time, Din_N makes a transition to "H" level; however, with PWCC2d in FIG. 14, arise speed remains constant regardless of VCNT2 so that Do2_N rises in normal delay time (step S1403).

Thus, since a scheme is adopted whereby an output pulse-width is adjusted by controlling a fall response of the CMOS inverter, an unbalanced relationship comes to exist between a positive waveform (Do2_P) and an negative waveform (Do2_N). The waveform shaping circuit WAC executes merger (averaging) of those unbalanced waveforms, thereby delivering output data units Dout_P, Dout_N, balancing with each other (steps S51404, S1405). As a result, a pulse width (step S1406) of each of Dout_P, and Dout_N, after the duration of consecutive "H" levels ("L" levels) will end up expanded as compared with a pulse width (step S1407) of each of the input data units Din_P, Din_N, corresponding to Dout_P, and Dout_N, respectively. Further, after the duration of consecutive "H" levels of Din_N (the duration of consecutive "K" levels of Din_P), contrary to the description as above, a pulse width will similarly end up expanded (steps S1408, S1409).

Thus, if charge that is based on a consecutive bits count of an input data unit is accumulated in a capacitive element by use of a pulse-width adjustable waveform equalization scheme according to the fourth embodiment, and a pulse-width is controlled according to an accumulation amount of the charge to thereby execute waveform equalization, it becomes possible to attain reduction in power consumption in the case of, typically, the waveform equalization circuit, as is the case with the first embodiment.

Fifth Embodiment

Figure 15:
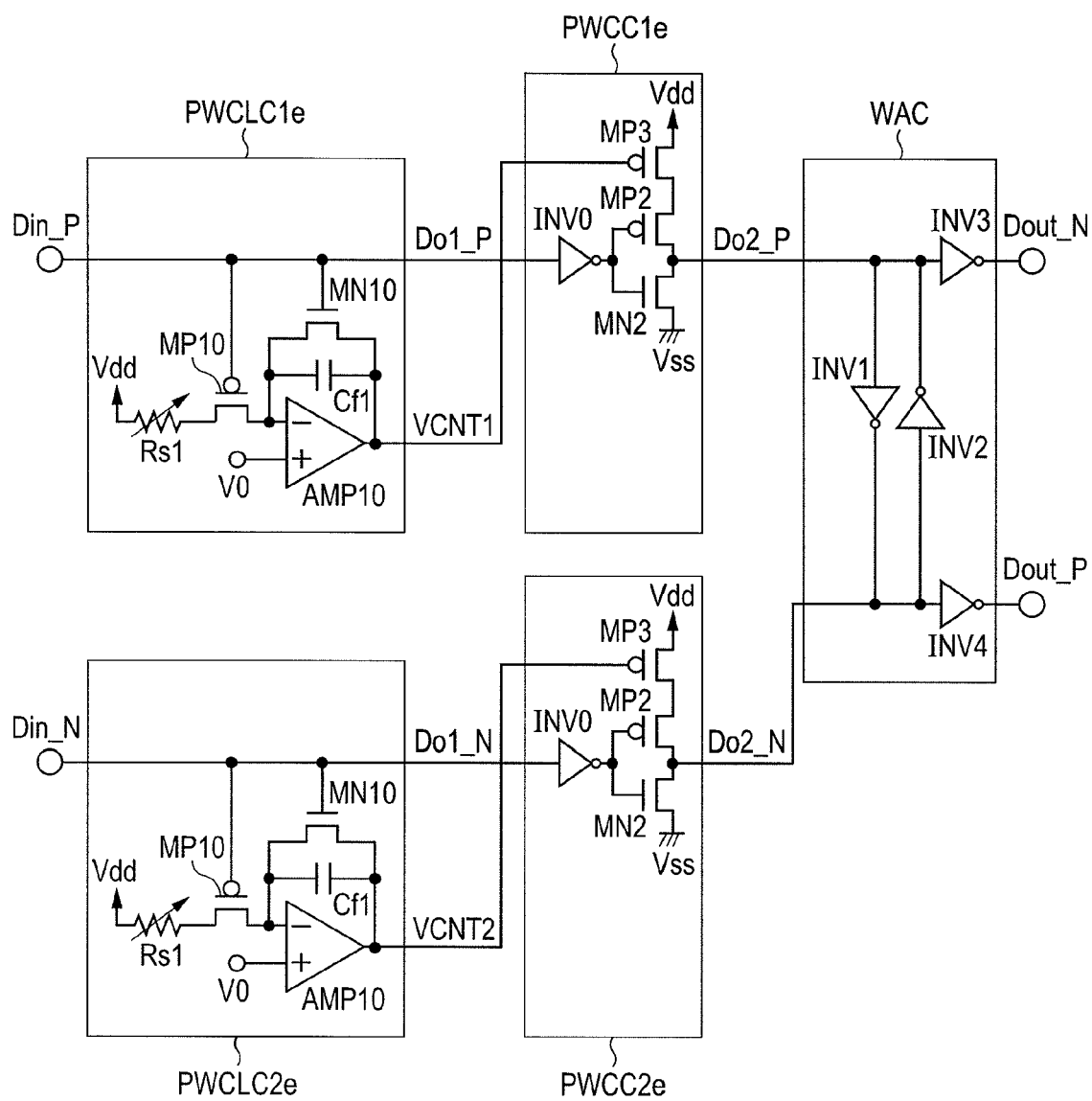
FIG. 15 is a circuit diagram showing a still further example of the detailed configurations of the respective blocks of the waveform equalization circuit with pulse width modulation shown in FIG. 1, in the case of a waveform equalization circuit with pulse width modulation according to a fifth embodiment of the present invention.

FIG. 15 is a circuit diagram showing a still further example of the detailed configurations of the respective blocks of the waveform equalization circuit with pulse width modulation shown in FIG. 1, in the case of a waveform equalization circuit with pulse width modulation according to a fifth embodiment of the present invention. The waveform equalization circuit with pulse width modulation shown in FIG. 15 is comprised of pulse-width adjust-level generation circuits PWCLC1e, PWCLC2e, pulse-width adjustment circuits PWCC1e, PWCC2e, and a waveform shaping circuit WAC.

The respective circuits described as above are similar in internal configuration to those circuits shown in FIG. 8, such as the pulse-width adjust-level generation circuits PWCLC1b, PWCLC2b, the pulse-width adjustment circuits PWCC1b, PWCC2b, and the waveform shaping circuit WAC. However, a first point of difference lies in that FIG. 8 shows the configuration wherein the output of AMP10 of PWCLC1b, and the output of AMP10 of PWCLC2b are connected to the common connection node, and the pulse-width adjust-level VCNT is generated from the common connection node, whereas, in FIG. 15, pulse-width adjust-levels VCNT1, VCNT2 are generated from the output of AMP10 of PWCLC1e, and the output of AMP10 of PWCLC2e, respectively. VCNT1 is connected to the gate of MP3 of PWCC1e, and VCNT2 is connected to the gate of MP3 of PWCC2e. A second point of difference lies in that a PMOS transistor MP10, and an NMOS transistor MN10, in PWCLC1e, PWCLC2e, respectively, shown in FIG. 15, are substituted for the NMOS transistor MN1, and the PMOS transistor MP1, in PWCLC1b, PWCLC2b, respectively, shown in FIG. 8. In other words, the PMOS transistor MP10 is interchanged with the NMOS transistor. Otherwise, circuit configurations are identical to those shown in FIG. 8, omitting therefore detailed description thereof.

Figure 16:
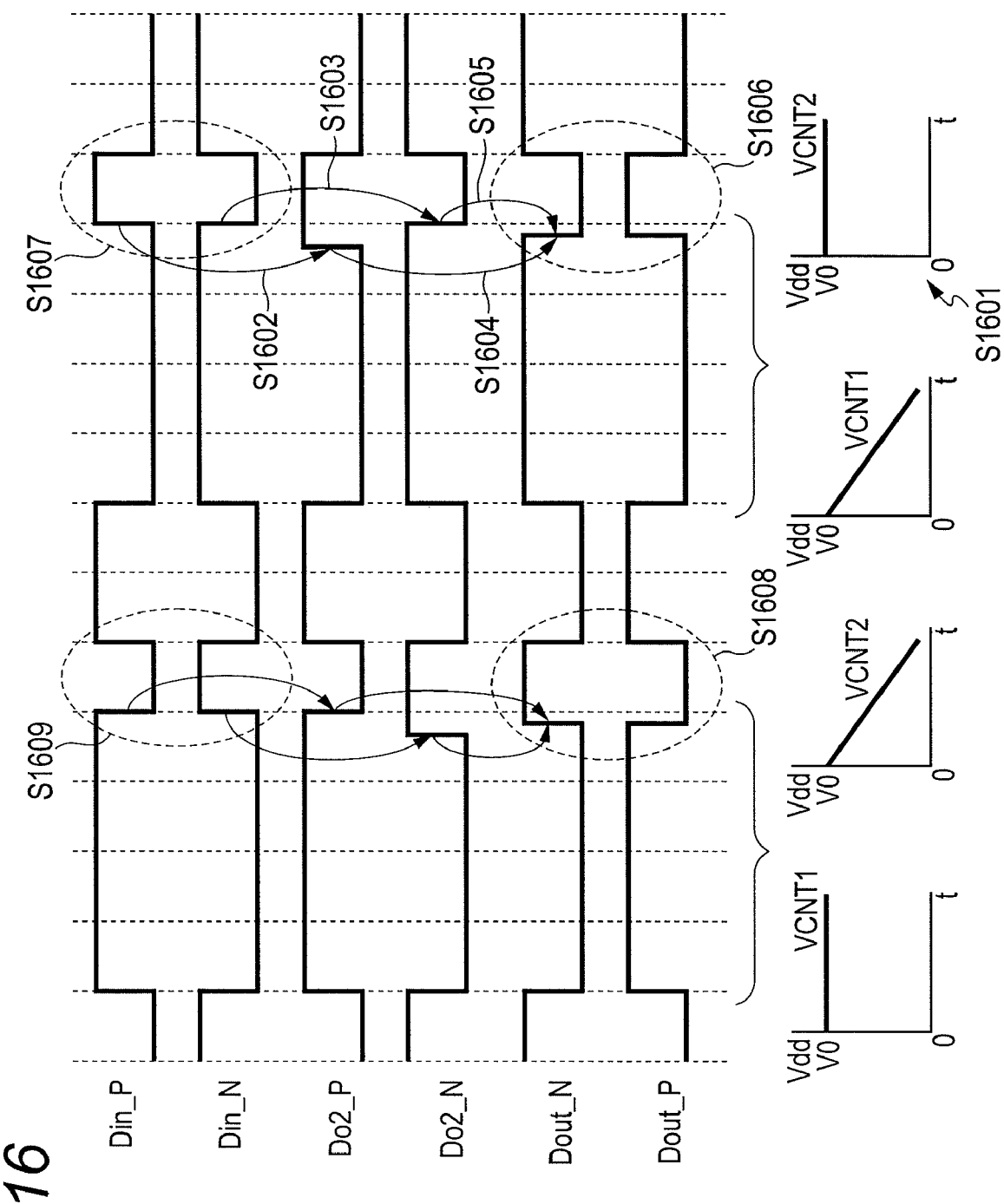
FIG. 16 is a waveform chart schematically showing the operation of the waveform equalization circuit with pulse width modulation shown in FIG. 15.

FIG. 16 is a waveform chart schematically showing the operation of the waveform equalization circuit with pulse width modulation shown in FIG. 15. As shown in FIG. 16, for the duration of consecutive "L" levels of Din_P (the duration of consecutive "H" levels of Din_N), VCNT1 from PWCLC1e falls while VCNT2 from PWCLC2e is kept at a constant value (V0) (step S1601). Thereafter, upon Din_P making a transition to "H" level, an output data unit Do2_P of PWCC1e rises in short delay time (step S1602). At this pint in time, Din_N makes a transition to "L" level; however, with PWCC2e in FIG. 15, a fall speed remains constant regardless of VCNT2 so that Do2_N falls in normal delay time (step S1603).

Thus, since a scheme is adopted whereby an output pulse-width is adjusted by controlling a rise response of the CMOS inverter, an unbalanced relationship comes to exist between a positive waveform (Do2_P) and an negative waveform (Do2_N). The waveform shaping circuit WAC executes merger (averaging) of those unbalanced waveforms, thereby delivering output data units Dout_P, and Dout_N, balancing with each other (steps S1604, S1605). As a result, a pulse width (step S1606) of each of Dout_P, and Dout_N, after the duration of consecutive "L" levels ("H" levels), will end up expanded as compared with a pulse width (step S1607) of each of the input data units Din_P, Din_N, corresponding to Dout_P, and Dout_N, respectively. Further, after the duration of consecutive "L" levels of Din_N (the duration of consecutive "H" levels of Din_P), contrary to the description as above, a pulse width of each of Dout_P, and Dout_N will similarly end up expanded (steps S1608, S1609).

Thus, if charge that is based on a consecutive bits count of an input data unit is accumulated in a capacitive element by use of a pulse-width adjustable waveform equalization scheme according to the fifth embodiment, and a pulse-width is controlled according to an accumulation amount of the charge to thereby execute waveform equalization, it becomes possible to attain reduction in power consumption in the case of, typically, the waveform equalization circuit, as is the case with the second embodiment.

Sixth Embodiment

Figure 17:
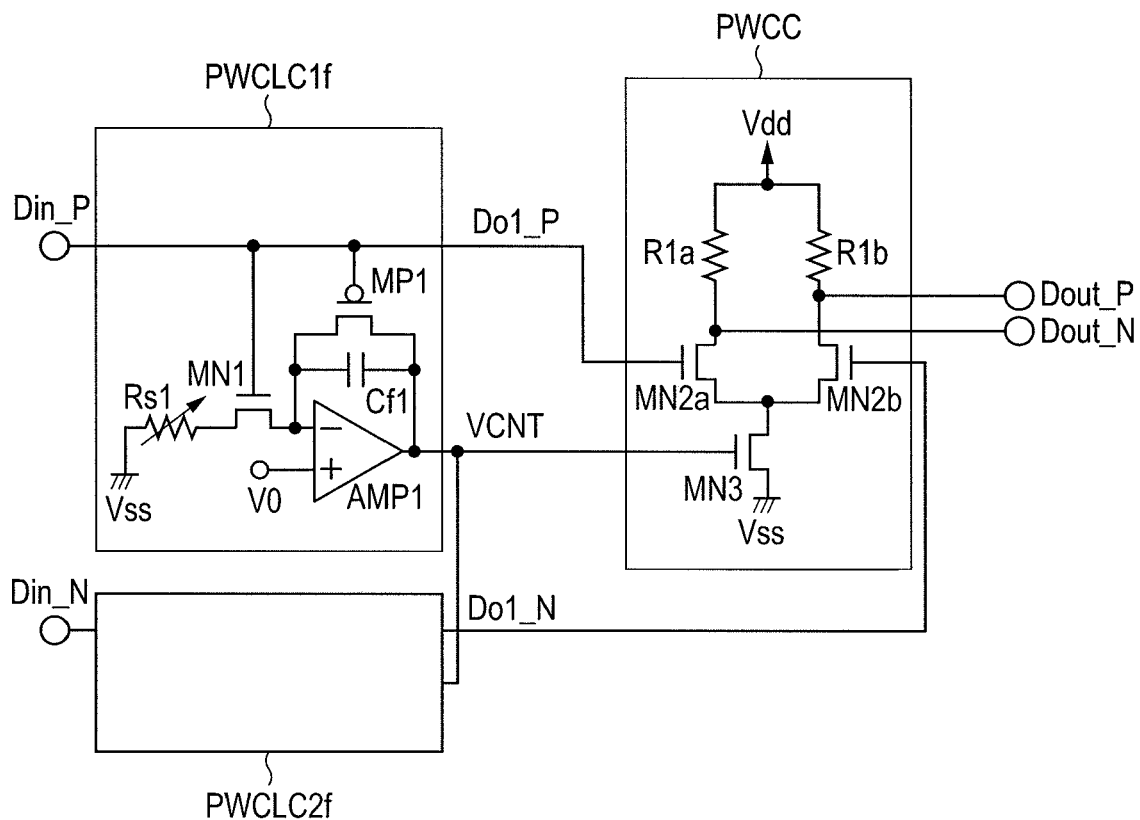
FIG. 17 is a block diagram showing an example of the configuration of a waveform equalization circuit with pulse width modulation according to a sixth embodiment of the present invention.
Figure 18:
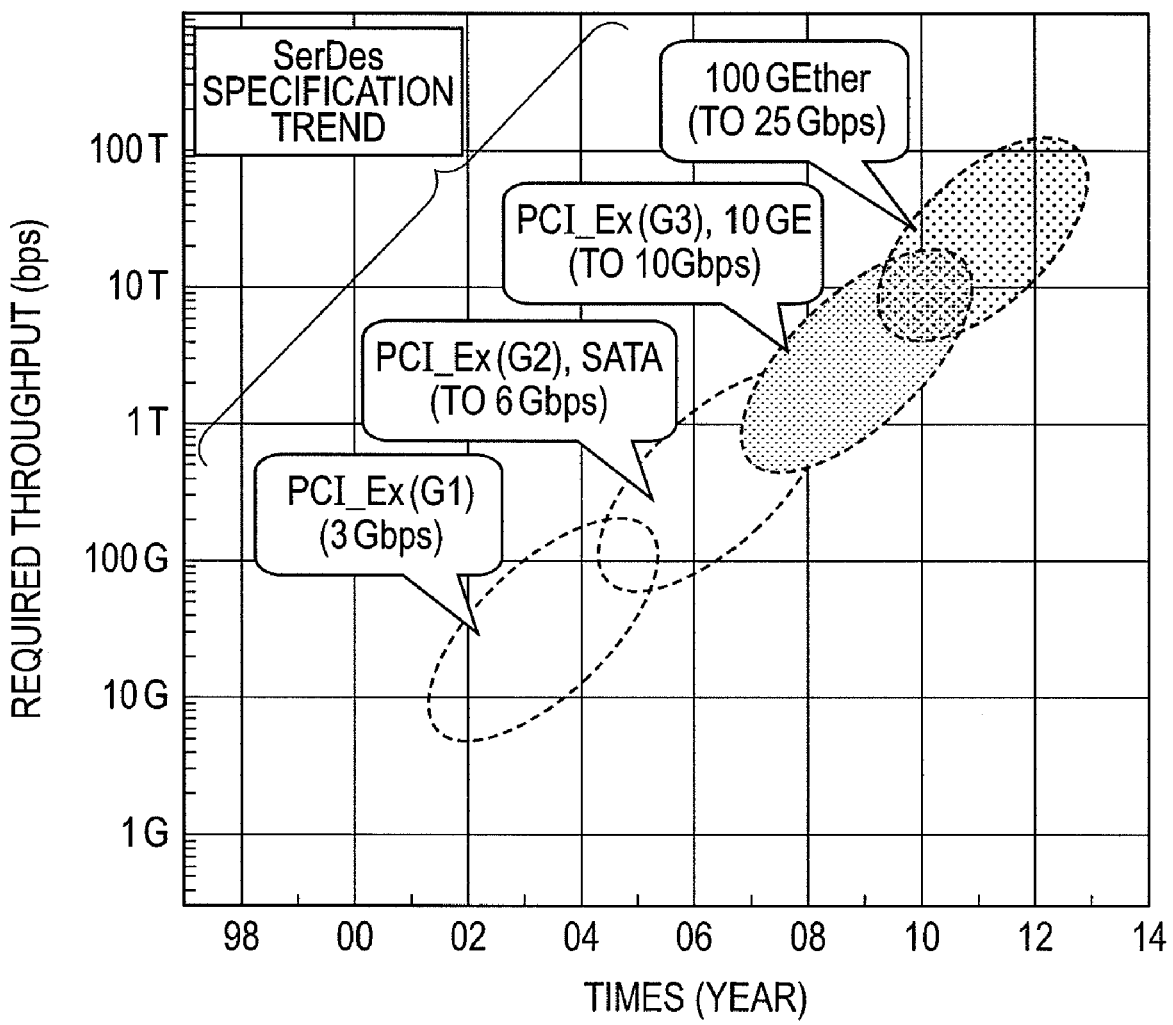
FIG. 18 is a view showing a trend for serial transmission technology specification.

FIG. 17 is a block diagram showing an example of the configuration of a waveform equalization circuit with pulse width modulation according to a sixth embodiment of the present invention. The waveform equalization circuit with pulse width modulation shown in FIG. 17 is comprised of pulse-width adjust-level generation circuits PWCLC1f, PWCLC2f, and a pulse-width adjustment circuit PWCC. PWCLC1f, PWCLC2f are identical in configuration to the pulse-width adjust-level generation circuits PWCLC1a, PWCLC2a, shown in FIG. 2, respectively, allowing input data units Din_P, Din_N to proceed therethrough before delivering output data units Do1_P, Do1_N, respectively. Further, for the duration of consecutive "H" levels of Din_P (the duration of consecutive "L" levels of Din_N), a pulse-width adjust-level VCNT is caused to rise, and upon a signal making a transition, VCNT is reverted toward the reference voltage V0.

PWCC is a so-called CML circuit, and is comprised of NMOS transistors MN2a, MN2b, in differential pairs, resistors R1a, R1b, serving as the respective loads of MN2a, MN2b, and an NMOS transistor MN3, serving as a tail current source. MN2a has a source connected to the drain of MN2b, and has a gate connected to Do1_P, delivering an output data unit Dout_N from the drain thereof. MN2b has a source connected to the drain of MN3, and a gate connected to Do1_N, delivering an output data unit Dout_P from the drain thereof. R1a, R1b each have one end connected to a common power supply voltage Vdd, having the other end connected to the drain of MN2a, and the drain of MN2b, respectively. MN3 has a source connected to the reference power supply voltage Vss, and has a gate connected to VCNT.

With the adoption of such a configuration as described above, after signals of Din_P, Din_N make a transition to "H" level, or "L" level, the drive power of PWCC will increase according to a time interval that the "H" level, or the "L" level is maintained. Assuming that the "H" level, or the "L" level is maintained for long duration, and subsequently, the signals of Din_P, Din_N make a transition again, a response of VCNT will occur somewhat behind the transition, so that PWCC will execute a switching operation at a high drive power at the instant when the signals make the transition. As a result, a pulse width after the duration of consecutive "H" levels ("L" levels) of each of output data units Dout_P, Dout_N will be expanded as compared with a pulse width of the input data units Din_P, Din_N, corresponding to Dout_P, Dout_N, respectively.

Thus, if charge that is based on a consecutive bits count of an input data unit is accumulated in a capacitive element by use of a pulse-width adjustable waveform equalization scheme according to the sixth embodiment, and a pulse-width is controlled according to an accumulation amount of the charge to thereby execute waveform equalization, it becomes possible to attain reduction in power consumption in the case of, typically, the waveform equalization circuit. Such advantageous effects can be obtained since the present embodiment can do with one CML circuit, and is capable of implementing waveform equalization at a small circuit scale, as compared with a circuit configuration shown in FIG. 19.

Having specifically described the invention developed by the inventor on the basis of the embodiments thereof, as described in the foregoing, it is to be understood that the invention be not limited to the embodiments, and that various changes and modifications may be made in the invention without departing from the spirit and scope thereof.

For example, it is possible to alter polarity of input/output, thereby altering a circuit configuration as appropriate. To take an example of the configuration shown in FIG. 13, a configuration can be cited wherein INV0s, in PWCC1d, and PWCC2d, respectively, are dispensed with, and in PWCLC1d, PWCLC2d, respectively, MP1 is interchanged with MN1. In this case, for the duration of consecutive "L" levels of Din_P, and while MP2 of PWCC1d is turned ON, and MN2 is turned OFF, a progress is made in charging of Cf1, thereby enhancing the drive power of MN3. Thereafter, upon Din_P making a transition to "H" level, Do2_P is caused to fall via MN2, and MN3 in short time.

What is claimed is:

1. A waveform equalization circuit with pulse width modulation comprising:
    a first pulse-width adjust-level generation circuit for receiving a positive input data unit as one of differential input data units, thereby generating a first control voltage undergoing variation according to a pulse width of the positive input data unit;
    a second pulse-width adjust-level generation circuit for receiving a negative input data unit as the other of the differential input data units, thereby generating a second control voltage undergoing variation according to a pulse width of the negative input data unit; and
    an output circuit for driving the differential input data units at drive powers corresponding to the first control voltage, and the second control voltage, respectively, thereby generating differential output data units differing in transition time from each other,
    wherein the first and second pulse-width adjust-level generation circuits each have a first integration circuit for maintaining a control voltage from itself at a first voltage during the interval that an input data unit to itself is at a first logic level while executing a transition operation against a first capacitive element after the input data unit to the itself undergoes a transition of to a second logic level, thereby causing the control voltage from the itself to undergo variation from the first voltage toward a second voltage.

2. The waveform equalization circuit with pulse width modulation according to claim 1, wherein the first integration circuit includes:
    an op-amp having one input node where the first voltage is inputted, having an output node where the control voltage from the itself is generated;
    the first capacitive element connected in parallel with a first switch, provided between the output node of the op-amp, and the other input node thereof;
    a second switch connected in series to a resistor, provided between the other input node of the op-amp, and a power supply voltage node thereof,
    wherein the first switch is turned ON when the input data unit to the itself is at the first logic level while the first switch is turned OFF when the input data unit to the itself is at the second logic level, and the second switch is turned OFF when the input data unit to the itself is at the first logic level while the second switch is turned ON when the input data unit to the itself is at the second logic level.

3. The waveform equalization circuit with pulse width modulation according to claim 2,
wherein the output node of the op-amp in the first pulse-width adjust-level generation circuit is connected to the output node of the op-amp in the second pulse-width adjust-level generation circuit via a common connection node, and the output circuit drives the differential input data units at a drive power corresponding to a control voltage of the common connection node.

4. The waveform equalization circuit with pulse width modulation according to claim 1,
wherein the output circuit includes:
a first pulse-width adjustment circuit for driving the positive input data unit at a driving power corresponding to the first control voltage;
a second pulse-width adjustment circuit for driving the negative input data unit at a driving power corresponding to the second control voltage; and
a waveform shaping circuit for executing averaging of a rising edge of an output of the first pulse-width adjustment circuit, and a falling edge of an output of the second pulse-width adjustment circuit, and averaging of a falling edge of the output of the first pulse-width adjustment circuit, and a rising edge of the output of the second pulse-width adjustment circuit.

5. The waveform equalization circuit with pulse width modulation according to claim 1,
wherein the first and second pulse-width adjust-level generation circuits each further includes a second integration circuit,
wherein the second integration circuit in the first pulse-width adjust-level generation circuit generates a third control voltage,
wherein the second integration circuit in the second pulse-width adjust-level generation circuit generates a fourth control voltage,
wherein the output circuit for driving the differential input data units at drive powers corresponding to the first to the fourth control voltages, respectively,
wherein the second integration circuit maintains a control voltage from itself at the third voltage for the duration of the input data unit to the itself at the first logic level while executing a transition operation against a second capacitive element after the input data unit to the itself undergoes a transition to the second logic level, thereby causing the control voltage from the itself to undergo variation from the third voltage toward the fourth voltage, and
wherein the second voltage is larger in value than the first voltage, and the fourth voltage is smaller in value than the third voltage.

6. A waveform equalization circuit with pulse width modulation, comprising:
a pulse-width adjust-level generation circuit for receiving differential input data units to generate a control voltage undergoing variation according to respective pulse widths of the differential input data units, or a plurality of the control voltages;
a first pulse-width adjustment circuit for driving a positive input data unit as one of the differential input data units at a driving power corresponding to the control voltage, thereby generating a first output data unit with transition time varied; and a second pulse-width adjustment circuit for driving a negative input data unit as the other of the differential input data units at a driving power corresponding to the control voltage, thereby generating a second output data unit with transition time varied,
the first and second pulse-width adjustment circuits each having:
a first MIS transistor of a first conductivity type, provided between a first power supply voltage node, and an output node;
a second MIS transistor of a second conductivity type, provided between a second power supply voltage node, and the output node; and
a third MIS transistor of the first conductivity type, connected in series to the first MIS transistor, provided between the first power supply voltage node, and the output node,
wherein an input data unit corresponding to either the positive input data unit, or the negative input data unit is transmitted to the respective gates of the first MIS transistor, and the second MIS transistor, and the control voltage is applied to the gate of the third MIS transistor.

7. The waveform equalization circuit with pulse width modulation according to claim 6, further comprising:
a waveform shaping circuit for executing averaging of a rising edge of the first output data unit, and a falling edge of the second output data unit, and averaging of a falling edge of the first output data unit, and a rising edge of the second output data unit to thereby generate a third output data unit, and a fourth output data unit.

8. The waveform equalization circuit with pulse width modulation according to claim 7,
wherein the waveform shaping circuit includes:
a first inverter for receiving the first output data unit as an input, having an output combined with the second output data unit; and
a second inverter for receiving the second output data unit as an input, having an output combined with the first output data unit.

9. The waveform equalization circuit with pulse width modulation according to claim 7,
wherein the control voltage has a characteristic that the control voltage is turned into a first voltage according to transition of the differential units to subsequently undergo variation toward a second voltage over time until occurrence of a next transition.

10. The waveform equalization circuit with pulse width modulation according to claim 7,
wherein the control voltage includes:
a first control voltage applied to the third MIS transistor of the first pulse-width adjustment circuit; and
a second control voltage applied to the third MIS transistor of the second pulse-width adjustment circuit,
wherein the first control voltage has a characteristic in that the first control voltage maintains a first voltage during the interval that the positive input data unit is at a first logic level, and after transition of the positive input data unit to a second logic level, the first control voltage undergoes variation toward a second voltage over a period of the second logic level, and
wherein the second control voltage has a characteristic in that the second control voltage maintains the first voltage during the interval that the negative input data unit is at the first logic level, and after transition of the negative input data unit to the second logic level, the negative control voltage undergoes variation toward the second voltage over the period of the second logic level.

11. The waveform equalization circuit with pulse width modulation according to claim 6, wherein the first and second pulse-width adjustment circuits each further includes a fourth MIS transistor of the second conductivity type, connected in series to the second MIS transistor, provided between the second power supply voltage node and the output node, and the control voltage is applied to the gate of the fourth MIS transistor.

12. A waveform equalization circuit with pulse width modulation, comprising:

a pulse-width adjust-level generation circuit for receiving input data units to generate control voltages undergoing variation according to respective pulse widths of the input data units; and a pulse-width adjustment circuit for generating output data units differing in transition time from each other by driving the input data units at driving powers corresponding to the respective control voltages wherein the pulse-width adjust-level generation circuit includes an integration circuit for maintaining the control voltage at a first voltage during the interval that the positive input data unit is at a first logic level while executing a transition operation against a capacitive element after transition of the input data unit to a second logic level, thereby causing the control voltage to undergo variation from the first voltage toward a second voltage.

13. The waveform equalization circuit with pulse width modulation according to claim 12, wherein the pulse-width adjust-level generation circuit includes:

a first MIS transistor of a first conductivity type, provided between a first power supply voltage node and an output node, a second MIS transistor of a second conductivity type, provided between a second power supply voltage node and the output node; and a third MIS transistor of the first conductivity type, connected in series to the first MIS transistor, provided between the first power supply voltage node and the output node, wherein the input data unit is transmitted to the respective gates of the first MIS transistor, and the second MIS transistor, and wherein the control voltage is applied to the gate of the third MIS transistor.

14. The waveform equalization circuit with pulse width modulation according to claim 12, wherein the integration circuit includes:

an op-amp having one input node where the first voltage is inputted, having an output node where the control voltage is generated;

the capacitive element connected in parallel with a first switch, provided between the output node of the op-amp, and the other input node thereof;

a second switch connected in series to a resistor, provided between the other input node of the op-amp, and a power supply voltage node thereof, wherein the first switch is turned ON when the input data unit is at the first logic level while the first switch is turned OFF when the input data unit is at the second logic level, and wherein the second switch is turned OFF when the input data unit is at the first logic level while the second switch is turned ON when the input data unit is at the second logic level.

* * * * *